US011274846B2

United States Patent
Yoshimi et al.

(10) Patent No.: US 11,274,846 B2
(45) Date of Patent: Mar. 15, 2022

(54) REFRIGERANT LEAKAGE DETERMINATION SYSTEM AND REFRIGERATION CYCLE APPARATUS

(71) Applicant: DAIKIN INDUSTRIES, LTD., Osaka (JP)

(72) Inventors: Manabu Yoshimi, Osaka (JP); Takeshi Hikawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/298,432

(22) PCT Filed: Nov. 29, 2019

(86) PCT No.: PCT/JP2019/046885
§ 371 (c)(1),
(2) Date: May 28, 2021

(87) PCT Pub. No.: WO2020/111264
PCT Pub. Date: Jun. 4, 2020

(65) Prior Publication Data
US 2021/0356155 A1 Nov. 18, 2021

(30) Foreign Application Priority Data
Nov. 29, 2018 (JP) .............................. JP2018-223022

(51) Int. Cl.
*F24F 11/36* (2018.01)
*F24F 11/42* (2018.01)
*F24F 11/63* (2018.01)
(52) U.S. Cl.
CPC .............. *F24F 11/36* (2018.01); *F24F 11/42* (2018.01); *F24F 11/63* (2018.01)

(58) Field of Classification Search
CPC .. F24F 11/63; F24F 11/42; F24F 11/36; F24F 11/41; F24F 11/43; F25B 2500/22; F25B 2500/221; F25B 2500/222
See application file for complete search history.

(56) References Cited

U.S. PATENT DOCUMENTS

2001/0054292 A1* 12/2001 Davis .................... F25D 21/006
62/154
2004/0210419 A1* 10/2004 Wiebe ................... F25B 49/005
702/182

(Continued)

FOREIGN PATENT DOCUMENTS

JP 6-123529 A 5/1994
JP 2006329551 A * 12/2006

(Continued)

OTHER PUBLICATIONS

International Search Report for PCT/JP2019/046885 dated Dec. 24, 2019.

(Continued)

Primary Examiner — Nelson J Nieves
(74) Attorney, Agent, or Firm — Birch, Stewart, Kolasch & Birch, LLP

(57) ABSTRACT

A refrigerant leakage determination system capable of detecting leakage of refrigerant without requiring complicated processing is provided. A refrigerant leakage determination system is a refrigerant leakage determination system of a refrigeration cycle apparatus that includes a refrigerant circuit including a heat-source-side heat exchanger and has, as operating modes, a normal mode in which the heat-source-side heat exchanger is caused to function as an evaporator and a defrosting mode in which the heat-source-side heat exchanger frosted during a normal operation is defrosted. The refrigerant leakage determination system includes a processor configured to acquire defrosting infor- (Continued)

mation regarding a relationship between a normal operation period and the number of defrosting operations, and memory that stores the defrosting information. The processor is further configured to determine, based on the acquired defrosting information, leakage of refrigerant in the refrigerant circuit.

19 Claims, 16 Drawing Sheets

(56) References Cited

U.S. PATENT DOCUMENTS

| | | | | |
|---|---|---|---|---|
| 2018/0094844 | A1* | 4/2018 | Suzuki | F25B 13/00 |
| 2019/0264965 | A1* | 8/2019 | Tanaka | F25B 49/02 |
| 2019/0316820 | A1* | 10/2019 | Zhai | F25B 49/005 |

FOREIGN PATENT DOCUMENTS

| | | | |
|---|---|---|---|
| JP | 2009-115340 A | | 5/2009 |
| JP | 2011174685 A | * | 9/2011 |

OTHER PUBLICATIONS

English translation of the International Preliminary Report on Patentability for International Application No. PCT/JP2019/046885, dated Jun. 10, 2021.

* cited by examiner

REFRIGERANT LEAKAGE DETERMINATION SYSTEM AND REFRIGERATION CYCLE APPARATUS

TECHNICAL FIELD

The present disclosure relates to a refrigerant leakage determination system of a refrigeration cycle apparatus and a refrigeration cycle apparatus having a refrigerant leakage determining function.

BACKGROUND ART

In a refrigeration cycle apparatus, refrigerant may leak from a refrigerant circuit because of long-term deterioration or the like, and an amount of refrigerant in the refrigerant circuit may decrease from an amount of refrigerant originally charged.

In relation to such an issue, PTL 1 (Japanese Unexamined Patent Application Publication No. 2009-115340) discloses a technique for performing an operation of an air conditioner, which is an example of a refrigeration cycle apparatus, in a heating cycle and determining an amount of refrigerant by using a value of a degree of subcooling in the air conditioner.

SUMMARY OF INVENTION

Technical Problem

However, the technique disclosed in PTL 1 (Japanese Unexamined Patent Application Publication No. 2009-115340) has an issue in that when an amount of refrigerant is determined, information regarding the number of outdoor units, the number of indoor units, a volume of an outdoor heat exchanger, and a volume of an indoor heat exchanger needs to be acquired, complicating processing relating to detection of leakage of the refrigerant.

Solution to Problem

A refrigerant leakage determination system according to a first aspect is a refrigerant leakage determination system of a refrigeration cycle apparatus. The refrigeration cycle apparatus includes a refrigerant circuit including a compressor and a first heat exchanger. The refrigeration cycle apparatus has, as operating modes, at least a normal mode and a defrosting mode. The normal mode is an operating mode in which the first heat exchanger is caused to function as an evaporator. The defrosting mode is an operating mode in which the first heat exchanger frosted during an operation in the normal mode is defrosted. The refrigerant leakage determination system includes a defrosting information acquiring unit, a storage unit, and a refrigerant leakage determining unit. The defrosting information acquiring unit acquires defrosting information. The defrosting information is information regarding a relationship between a normal operation period for which the refrigeration cycle apparatus operates in the normal mode and the number of defrosting operations in which the refrigeration cycle apparatus operates in the defrosting mode. The storage unit stores the defrosting information acquired by the defrosting information acquiring unit. The refrigerant leakage determining unit determines, based on the defrosting information, leakage of refrigerant in the refrigerant circuit of the refrigeration cycle apparatus.

The refrigerant leakage determination system according to the first aspect can detect leakage of the refrigerant without requiring complicated processing for acquiring special information such as a capacity of a heat exchanger.

A refrigerant leakage determination system according to a second aspect is the refrigerant leakage determination system according to the first aspect that further includes an operation condition acquiring unit that acquires an operation condition. The operation condition includes at least one of a temperature of air that exchanges heat in the first heat exchanger, a humidity of the air that exchanges heat in the first heat exchanger, and the number of rotations of the compressor when the refrigeration cycle apparatus is in operation in the normal mode. The refrigerant leakage determining unit determines, based further on the operation condition, leakage of the refrigerant in the refrigerant circuit of the refrigeration cycle apparatus.

The refrigerant leakage determination system according to the second aspect determines leakage of the refrigerant, based on the frequency of the defrosting operations in consideration of the temperature or humidity of the air that exchanges heat with the first heat exchanger or the number of rotations of the compressor that are obtained during the normal operation and may influence the frequency of the defrosting operations. Therefore, this refrigerant leakage determination system can accurately determine the occurrence of leakage of the refrigerant.

A refrigerant leakage determination system according to a third aspect is the refrigerant leakage determination system according to the first or second aspect, in which the refrigerant leakage determining unit calculates, as a first value, based on the defrosting information, a value serving as an index of a frequency of the defrosting operations relative to the normal operation period or a value serving as an index of a change in the frequency of the defrosting operations relative to the normal operation period. The refrigerant leakage determining unit determines, based on a result of comparing the first value with a reference value, leakage of the refrigerant in the refrigerant circuit of the refrigeration cycle apparatus.

The refrigerant leakage determination system according to the third aspect can accurately determine leakage of the refrigerant.

A refrigerant leakage determination system according to a fourth aspect is the refrigerant leakage determination system according to the third aspect that further includes a reference value calculating unit. The reference value calculating unit calculates the reference value, based on the defrosting information of past stored in the storage unit.

In the refrigerant leakage determination system according to the fourth aspect, since the reference value used for determining whether there is leakage of the refrigerant is calculated from the defrosting information of the refrigeration cycle apparatus itself, an influence of a difference in characteristics of apparatuses, a difference in installed environments of the apparatuses, or the like on determination of leakage of the refrigerant can be suppressed.

A refrigerant leakage determination system according to a fifth aspect is the refrigerant leakage determination system according to the fourth aspect in which the reference value calculating unit calculates the reference value, based on the defrosting information of past stored in the storage unit in a predetermined period from introduction of the refrigeration cycle apparatus.

In the refrigerant leakage determination system according to the fifth aspect, since the reference value is calculated based on the defrosting information for the predetermined period from introduction of the refrigeration cycle apparatus with a relatively low probability of leakage of the refrigerant due to long-term deterioration, it is particularly easy to calculate an appropriate reference value.

A refrigerant leakage determination system according to a sixth aspect is the refrigerant leakage determination system according to the fourth aspect in which the refrigerant leakage determination system is a system that determines leakage of refrigerant for a plurality of the refrigeration cycle apparatuses. The reference value calculating unit calculates the reference value, based on the defrosting information of past of the plurality of refrigeration cycle apparatuses stored in the storage unit.

In the refrigerant leakage determination system according to the sixth aspect, since the reference value is calculated based on many pieces of defrosting information obtained from the plurality of refrigeration cycle apparatuses instead of the defrosting information of a single refrigeration cycle apparatus, an appropriate reference value tends to be obtained.

A refrigerant leakage determination system according to a seventh aspect is the refrigerant leakage determination system according to the sixth aspect in which the reference value calculating unit calculates, for each refrigeration cycle apparatus group, the reference value, based on the defrosting information of past stored in the storage unit for a plurality of the refrigeration cycle apparatuses included in the refrigeration cycle apparatus group. Each refrigeration cycle apparatus group includes the plurality of refrigeration cycle apparatuses having similar conditions in terms of a temperature and a humidity of air that exchanges heat in the first heat exchanger. When determining leakage of the refrigerant in the refrigerant circuit of a first refrigeration cycle apparatus that is one of the plurality of refrigeration cycle apparatuses, the refrigerant leakage determining unit determines, based on a result of comparing the first value with the reference value, leakage of the refrigerant in the refrigerant circuit of the first refrigeration cycle apparatus. The first value is a value calculated based on the defrosting information of the first refrigeration cycle apparatus. The reference value is a value calculated for the refrigeration cycle apparatus group having a temperature and a humidity similar to those of the air that exchanges heat in the first heat exchanger of the first refrigeration cycle apparatus.

In the refrigerant leakage determination system according to the seventh aspect, since the reference value is calculated based on the defrosting information obtained from the plurality of refrigeration cycle apparatuses having similar temperature and humidity conditions at installed places, an appropriate reference value tends to be obtained.

A refrigerant leakage determination system according to an eighth aspect is the refrigerant leakage determination system according to any of the first to seventh aspects that further includes a defrosting period information acquiring unit. The defrosting period information acquiring unit acquires defrosting period information regarding a period of each defrosting operation in which the refrigeration cycle apparatus operates in the defrosting mode. The refrigerant leakage determining unit determines, based further on the defrosting period information, leakage of the refrigerant in the refrigerant circuit of the refrigeration cycle apparatus.

The refrigerant leakage determination system according to the eighth aspect determines leakage of the refrigerant based on the defrosting period information in addition to the defrosting information, thus enabling accurate refrigerant leakage determination.

A refrigerant leakage determination system according to a ninth aspect is the refrigerant leakage determination system according to the first aspect that further includes an operation condition acquiring unit that acquires an operation condition. The operation condition includes at least one of a temperature of air that exchanges heat in the first heat exchanger, a humidity of the air that exchanges heat in the first heat exchanger, and the number of rotations of the compressor when the refrigeration cycle apparatus is in operation in the normal mode. The refrigerant leakage determining unit includes a discriminator that has learned a relationship between whether there is leakage of the refrigerant in the refrigerant circuit and the defrosting information and the operation condition. The refrigerant leakage determining unit determines leakage of the refrigerant in the refrigerant circuit by inputting the defrosting information acquired by the defrosting information acquiring unit and the operation condition acquired by the operation condition acquiring unit to the discriminator.

The refrigerant leakage determination system according to the ninth aspect can accurately determine leakage of the refrigerant by using machine learning.

A refrigerant leakage determination system according to a tenth aspect is the refrigerant leakage determination system according to the first aspect that further includes a defrosting period information acquiring unit and an operation condition acquiring unit that acquires an operation condition. The defrosting period information acquiring unit acquires defrosting period information regarding a period of each defrosting operation in which the refrigeration cycle apparatus operates in the defrosting mode. The operation condition includes at least one of a temperature of air that exchanges heat in the first heat exchanger, a humidity of the air that exchanges heat in the first heat exchanger, and the number of rotations of the compressor when the refrigeration cycle apparatus is in operation in the normal mode. The refrigerant leakage determining unit includes a discriminator that has learned a relationship between whether there is leakage of the refrigerant in the refrigerant circuit and the defrosting information, the defrosting period information, and the operation condition. The refrigerant leakage determining unit determines leakage of the refrigerant in the refrigerant circuit by inputting the defrosting information acquired by the defrosting information acquiring unit, the defrosting period information, and the operation condition acquired by the operation condition acquiring unit to the discriminator.

The refrigerant leakage determination system according to the tenth aspect can accurately determine leakage of the refrigerant by using machine learning.

A refrigerant leakage determination system according to an eleventh aspect is the refrigerant leakage determination system according to the second aspect in which each of pieces of defrosting information for a plurality of time points is stored in the storage unit in association with one or a plurality of operation conditions for a corresponding time point of the plurality of time points. The refrigerant leakage determining unit determines leakage of the refrigerant in the refrigerant circuit of the refrigeration cycle apparatus, based on a result of comparing a distribution of points with a reference distribution. The distribution of points is a distribution obtained when the points each specified by a value serving as an index of the frequency of the defrosting operations calculated for each of the pieces of defrosting information for the plurality of time points stored in the storage unit and by a value of one or a plurality of first operation conditions, among the operation conditions, associated with the piece of defrosting information are plotted in coordinates of two or more dimensions obtained by assigning the value serving as the index of the frequency of the defrosting operations relative to the normal operation period to a first axis and assigning, for each of the one or plurality of first operation conditions, a value of the first operation condition to another axis different from the first axis.

The refrigerant leakage determination system according to the eleventh aspect can accurately determine the occurrence of leakage of the refrigerant.

A refrigeration cycle apparatus according to a twelfth aspect includes a refrigerant circuit including a compressor and a first heat exchanger. The refrigeration cycle apparatus has, as operating modes, at least a normal mode and a defrosting mode. The normal mode is an operating mode in which the first heat exchanger is caused to function as an evaporator. The defrosting mode is an operating mode in which the first heat exchanger frosted during an operation in the normal mode is defrosted. The refrigeration cycle apparatus includes a defrosting information acquiring unit, a storage unit, and a refrigerant leakage determining unit. The defrosting information acquiring unit acquires defrosting information regarding a relationship between a normal operation period for which the refrigeration cycle apparatus operates in the normal mode and the number of defrosting operations in which the refrigeration cycle apparatus operates in the defrosting mode. The storage unit stores the defrosting information acquired by the defrosting information acquiring unit. The refrigerant leakage determining unit determines, based on the defrosting information, leakage of refrigerant in the refrigerant circuit.

DESCRIPTION OF EMBODIMENTS

First Embodiment

Figure 1:
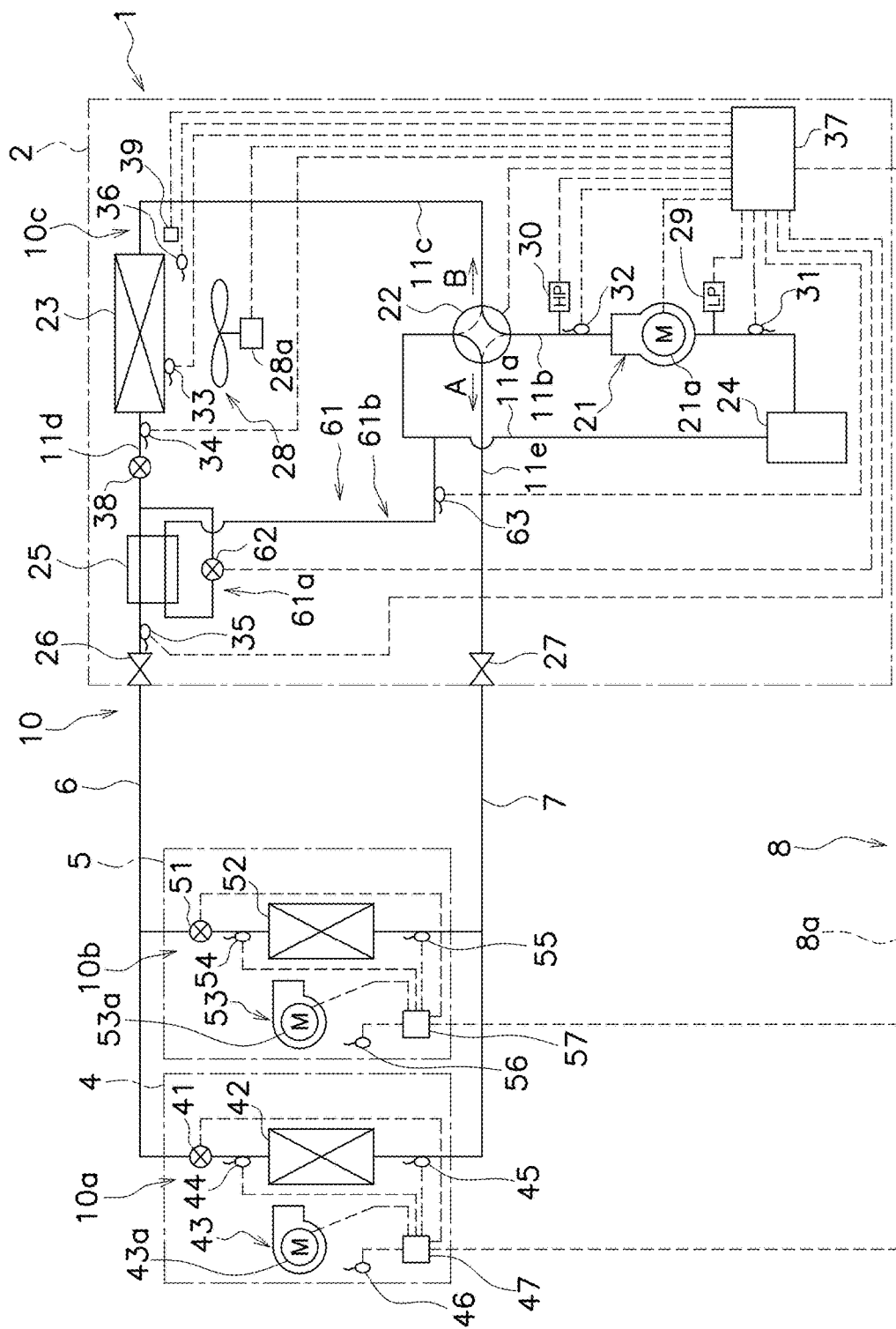
FIG. 1 is a schematic configuration diagram of a refrigeration cycle apparatus including a refrigerant leakage determination system according to a first embodiment.
Figure 2:
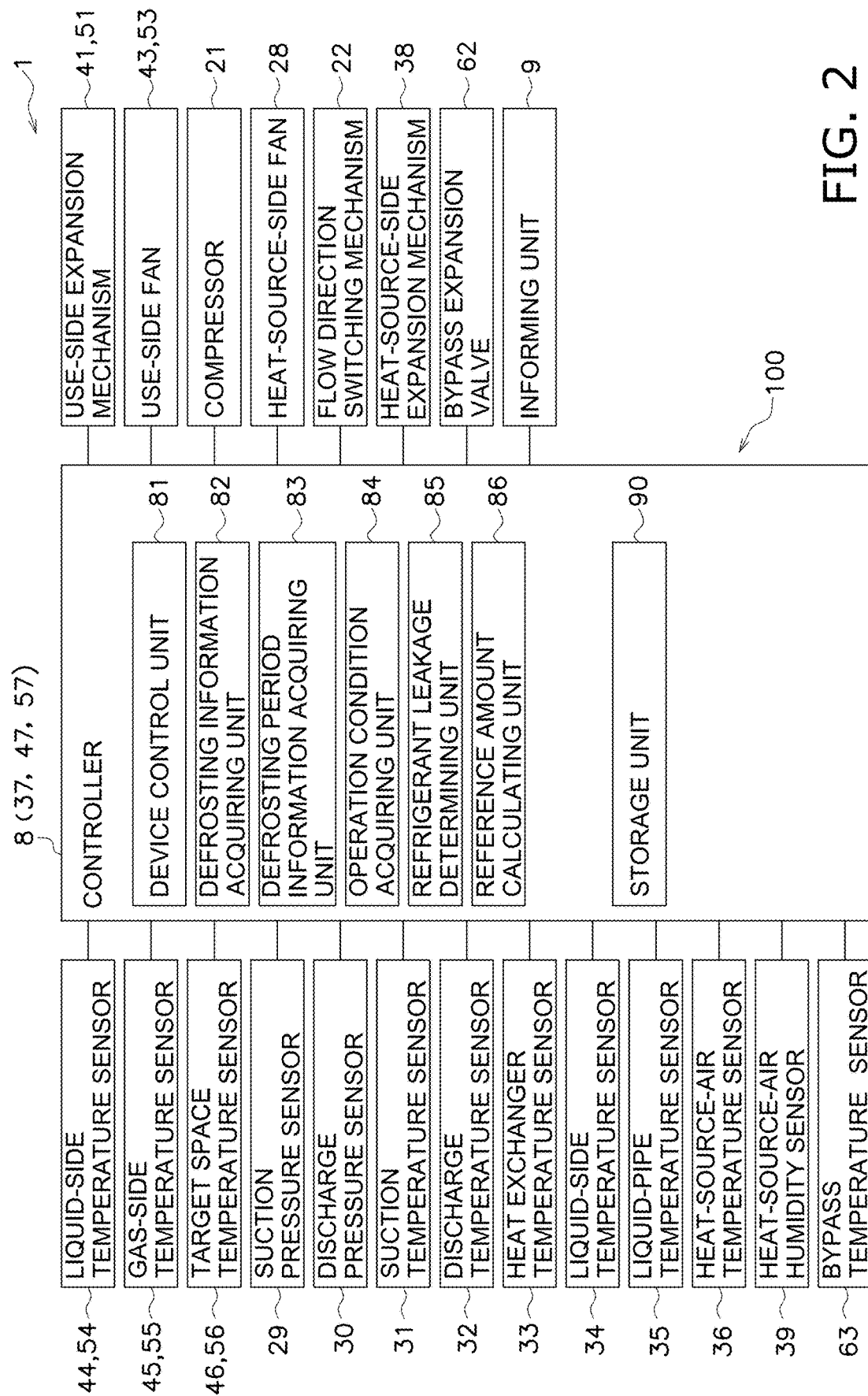
FIG. 2 is a block diagram of the refrigeration cycle apparatus illustrated in FIG. 1.

A refrigeration cycle apparatus 1 including a refrigerant leakage determination system 100 according to a first embodiment will be described with reference to the drawings.
(1) Overall Configuration FIG. 1 is a schematic configuration diagram of the refrigeration cycle apparatus 1 including the refrigerant leakage determination system 100 according to the first embodiment. FIG. 2 is a block diagram of the refrigeration cycle apparatus 1.

The refrigeration cycle apparatus 1 according to the present embodiment is an air conditioner that cools or heats a target space by performing a vapor compression refrigeration cycle. However, the refrigeration cycle apparatus 1 is not limited to an air conditioner and may be an apparatus other than an air conditioner, for example, a hot water supply apparatus or the like.

The refrigeration cycle apparatus 1 mainly includes a single heat source unit 2, a plurality of (two in the present embodiment) use units 4 and 5 connected in parallel to the heat source unit 2, a liquid refrigerant connection pipe 6, a gas refrigerant connection pipe 7, and a controller 8 (see FIGS. 1 and 2). The liquid refrigerant connection pipe 6 and the gas refrigerant connection pipe 7 are pipes that connect the heat source unit 2 and the use units 4 and 5 to each other (see FIG. 1). The controller 8 controls operations of various devices of the heat source unit 2 and the use units 4 and 5. In the present embodiment, the controller 8 also functions as the refrigerant leakage determination system 100 (see FIG. 2).

In the present embodiment, the refrigeration cycle apparatus 1 includes two use units. However, the number of use units is not limited to two. The refrigeration cycle apparatus 1 may include one use unit or three or more use units. The refrigeration cycle apparatus 1 includes one heat source unit 2. However, the number of heat source units 2 is not limited to one. The refrigeration cycle apparatus 1 may include a plurality of heat source units 2 connected in parallel to each other.

The heat source unit 2 and the use units 4 and 5 are connected to each other through the liquid refrigerant connection pipe 6 and the gas refrigerant connection pipe 7 to constitute a refrigerant circuit 10 (see FIG. 1). The refrigerant circuit 10 includes a compressor 21, a heat-source-side heat exchanger 23, and a flow direction switching mechanism 22 of the heat source unit 2, a use-side heat exchanger 42 of the use unit 4, and a use-side heat exchanger 52 of the use unit 5 (see FIG. 1). Preferably, the refrigerant circuit 10 further includes a subcooling heat exchanger 25 and a bypass expansion valve 62 of the heat source unit 2 (see FIG. 1).

Refrigerant used in the refrigeration cycle apparatus 1 is, for example, but not limited to, fluorocarbon refrigerant such as R32. The refrigerant used in the refrigeration cycle apparatus 1 may be natural refrigerant.

The refrigeration cycle apparatus 1 has, as operating modes, a cooling mode, a heating mode, and a defrosting mode. The heating mode is an example of a normal mode. The cooling mode is an operating mode in which the heat-source-side heat exchanger 23 is caused to function as a condenser and the use-side heat exchangers 42 and 52 are caused to function as evaporators so as to cool air in a target space where the use units 4 and 5 are installed. The heating mode is an operating mode in which the heat-source-side heat exchanger 23, which is an example of a first heat exchanger, is caused to function as an evaporator and the use-side heat exchangers 42 and 52 are caused to function as condensers so as to heat air in a target space where the use units 4 and 5 are installed. A heating operation is an example of a normal operation. The defrosting mode is an operating mode in which the heat-source-side heat exchanger 23 frosted during an operation in the heating mode is defrosted.

The refrigeration cycle apparatus 1 has, as operating modes, the normal mode and the defrosting mode in the case where the refrigeration cycle apparatus 1 is a hot water supply apparatus. The normal mode is an operating mode in which a heat-source-side heat exchanger is caused to function as an evaporator so as to heat water at a use-side heat exchanger. The defrosting mode is an operating mode in which the heat-source-side heat exchanger frosted during an operation in the normal mode is defrosted.

(2) Detailed Configuration

The use units 4 and 5, the heat source unit 2, the connection pipes 6 and 7, and the controller 8 of the refrigeration cycle apparatus 1 will be described in detail.

(2-1) Use Units

The use units 4 and 5 are units installed in a target space such as rooms in a building. For example, the use units 4 and 5 are ceiling-embedded units installed at the ceiling. However, the use units 4 and 5 are not limited to ceiling-embedded units, and may be ceiling-suspended units suspended from the ceiling, wall-mounted units mounted on the wall, or floor-standing units placed on the floor.

As described above, the use units 4 and 5 are connected to the heat source unit 2 through the liquid refrigerant connection pipe 6 and the gas refrigerant connection pipe 7 and constitute part of the refrigerant circuit 10.

The use unit 4 includes a use-side refrigerant circuit 10a that constitutes part of the refrigerant circuit 10 (see FIG. 1). The use-side refrigerant circuit 10a mainly includes a use-side expansion mechanism 41 and the use-side heat exchanger 42 (see FIG. 1). The use unit 4 includes a use-side fan 43 driven by a motor 43a (see FIG. 1). The use unit 4 includes various sensors. In the present embodiment, the various sensors of the use unit 4 include a liquid-side temperature sensor 44, a gas-side temperature sensor 45, and a target space temperature sensor 46 (see FIG. 1). The use unit 4 includes a use-side control unit 47 that controls operations of the use unit 4 (see FIG. 1).

The use unit 5 includes a use-side refrigerant circuit 10b that constitutes part of the refrigerant circuit 10 (see FIG. 1). The use-side refrigerant circuit 10b mainly includes a use-side expansion mechanism 51 and the use-side heat exchanger 52 (see FIG. 1). The use unit 5 includes a use-side fan 53 driven by a motor 53a (see FIG. 1). The use unit 5 includes various sensors. In the present embodiment, the various sensors of the use unit 5 include a liquid-side temperature sensor 54, a gas-side temperature sensor 55, and a target space temperature sensor 56 (see FIG. 1). The use unit 5 includes a use-side control unit 57 that controls operations of the use unit 5 (see FIG. 1). Note that the configuration of each component of the use unit 5 is substantially the same as the configuration of the corresponding component of the use unit 4. Therefore, only the components of the use unit 4 will be described below, and description of the components of the use unit 5 will be omitted unless otherwise necessary.

(2-1-1) Use-Side Heat Exchanger

At the use-side heat exchanger 42, refrigerant flowing through the use-side heat exchanger 42 and a medium passing through the use-side heat exchanger 42 exchange heat. In the present embodiment, at the use-side heat exchanger 42, the refrigerant flowing through the use-side heat exchanger 42 and air in a target space exchange heat.

One end of the use-side heat exchanger 42 is connected to the liquid refrigerant connection pipe 6 through a refrigerant pipe. Another end of the use-side heat exchanger 42 is connected to the gas refrigerant connection pipe 7 through a refrigerant pipe.

The use-side heat exchanger 42 is, for example, a cross-fin-type finned-tube heat exchanger including a heat transfer tube (not illustrated) and many fins (not illustrated) although the type is not limited to this.

The use-side heat exchanger 42 functions as an evaporator during a cooling operation and a defrosting operation. The use-side heat exchanger 42 functions as a condenser during a heating operation.

(2-1-2) Use-Side Expansion Mechanism

The use-side expansion mechanism 41 is a mechanism for adjusting a pressure and a flow rate of the refrigerant that flows through the use-side refrigerant circuit 10a. The use-side expansion mechanism 41 is disposed at the refrigerant pipe that connects a liquid side of the use-side heat exchanger 42 and the liquid refrigerant connection pipe 6 to each other. The use-side expansion mechanism 41 is, for example, an electronic expansion valve with a variable opening degree. However, the use-side expansion mechanism 41 is not limited to an electronic expansion valve, and a mechanism generally used as an expansion mechanism in a refrigeration cycle apparatus may be appropriately selected.

(2-1-3) Use-Side Fan

The use-side fan 43 is a mechanism that takes air in the target space into the use unit 4, supplies the air to the use-side heat exchanger 42, and blows out, to the target space, the air that has exchanged heat with the refrigerant at the use-side heat exchanger 42. The use-side fan 43 is, for example, a sirocco fan. However, the type of the use-side fan 43 is not limited to a sirocco fan, and may be appropriately selected. The use-side fan 43 is driven by the motor 43a. The use-side fan 43 is a variable airflow fan driven by the motor 43a capable of changing the number of rotations.

(2-1-4) Sensors

The use unit 4 includes, as sensors, the liquid-side temperature sensor 44, the gas-side temperature sensor 45, and the target space temperature sensor 46 (see FIG. 1). Note that the use unit 4 need not include all the aforementioned sensors 44 to 46 and may include only at least one of them. The heat source unit 2 may also include a sensor other than the aforementioned sensors 44 to 46.

The liquid-side temperature sensor 44 is disposed at the refrigerant pipe that connects the liquid side of the use-side heat exchanger 42 and the liquid refrigerant connection pipe 6 to each other. The liquid-side temperature sensor 44 measures a temperature of the refrigerant flowing through the refrigerant pipe on the liquid side of the use-side heat exchanger 42. The gas-side temperature sensor 45 is disposed at the refrigerant pipe that connects a gas side of the use-side heat exchanger 42 and the gas refrigerant connection pipe 7 to each other. The gas-side temperature sensor 45 measures a temperature of the refrigerant flowing through the refrigerant pipe on the gas side of the use-side heat exchanger 42. The target space temperature sensor 46 is disposed on a target-space-air suction port side of the use unit 4. The target space temperature sensor 46 detects a temperature (target space temperature Tr) of air in the target space that flows into the use unit 4.

In the present embodiment, the liquid-side temperature sensor 44, the gas-side temperature sensor 45, and the target space temperature sensor 46 are thermistors although the types of the sensors are not limited to this.

(2-1-5) Use-Side Control Unit

The use-side control unit 47 controls operations of the individual components of the use unit 4.

The use-side control unit 47 includes a microcomputer, a memory, and so on that are provided to control the use unit 4.

The use-side control unit 47 is electrically connected to the use-side expansion mechanism 41, the use-side fan 43, the liquid-side temperature sensor 44, the gas-side temperature sensor 45, and the target space temperature sensor 46 of the use unit 4 so as to be able to transmit and receive control signals and information (see FIG. 1). The use-side control unit 47 is also connected to a heat-source-side control unit 37 of the heat source unit 2 by a transmission line 8a in a state in which the use-side control unit 47 can transmit and receive control signals and the like to and from the heat-source-side control unit 37. Note that the use-side control unit 47 and the heat-source-side control unit 37 need not be connected to each other by the physical transmission line 8a. The use-side control unit 47 and the heat-source-side control unit 37 may be wirelessly connected to each other so as to be able to perform communication. The use-side control unit 47 is configured to be able to receive various signals transmitted from a remote control (not illustrated) for operating the use unit 4. The various signals include signals relating to starting and stopping of the use unit 4 and signals relating to various settings. The signals relating to various settings include, for example, an operating mode switching signal and a target temperature (set temperature Trs) of the cooling operation or the heating operation.

The use-side control unit 47 and the use-side control unit 57 of the use unit 5, and the heat-source-side control unit 37 of the heat source unit 2 that is connected to the use-side control units 47 and 57 through the transmission line 8a function as the controller 8 in cooperation with each other. Functions of the controller 8 will be described below.

(2-2) Heat Source Unit

The heat source unit 2 is installed, for example, outside of a building where the refrigeration cycle apparatus 1 is installed.

The heat source unit 2 is connected to the use units 4 and 5 through the liquid refrigerant connection pipe 6 and the gas refrigerant connection pipe 7. The heat source unit 2 constitutes the refrigerant circuit 10 together with the use units 4 and 5 (see FIG. 1).

The heat source unit 2 includes a heat-source-side refrigerant circuit 10c that constitutes part of the refrigerant circuit 10 (see FIG. 1). The heat-source-side refrigerant circuit 10c mainly includes the compressor 21, the flow direction switching mechanism 22, the heat-source-side heat exchanger 23, a heat-source-side expansion mechanism 38, an accumulator 24, the subcooling heat exchanger 25, the bypass expansion valve 62, a liquid-side shutoff valve 26, and a gas-side shutoff valve 27 (see FIG. 1). The heat source unit 2 includes a heat-source-side fan 28 driven by a motor 28a (see FIG. 1). The heat source unit 2 includes various sensors. The sensors of the heat source unit 2 will be described below. The heat source unit 2 includes the heat-source-side control unit 37 (see FIG. 1).

The heat source unit 2 also includes a suction pipe 11a, a discharge pipe 11b, a first gas refrigerant pipe 11c, a liquid refrigerant pipe 11d, a second gas refrigerant pipe 11e, a bypass refrigerant pipe 61 (see FIG. 1).

The suction pipe 11a connects the flow direction switching mechanism 22 and a suction side of the compressor 21 to each other (see FIG. 1). The suction pipe 11a is provided with the accumulator 24 (see FIG. 1). The discharge pipe lib connects a discharge side of the compressor 21 and the flow direction switching mechanism 22 to each other (see FIG. 1). The first gas refrigerant pipe 11c connects the flow direction switching mechanism 22 and a gas side of the heat-source-side heat exchanger 23 to each other (see FIG. 1). The liquid refrigerant pipe 11d connects a liquid side of the heat-source-side heat exchanger 23 and the liquid refrigerant connection pipe 6 to each other (see FIG. 1). The liquid refrigerant pipe 11d is an example of a main refrigerant pipe that connects the heat-source-side heat exchanger 23 and the use-side heat exchangers 42 and 52 to each other. The liquid refrigerant pipe 11d is provided with the heat-source-side expansion mechanism 38 (see FIG. 1). The liquid refrigerant pipe 11d is provided with the subcooling heat exchanger 25 (see FIG. 1). A connection portion of the liquid refrigerant pipe 11d and the liquid refrigerant connection pipe 6 is provided with the liquid-side shutoff valve 26 (see FIG. 1). The second gas refrigerant pipe 11e connects the flow direction switching mechanism 22 and the gas refrigerant connection pipe 7 to each other (see FIG. 1). A connection portion of the second gas refrigerant pipe 11e and the gas refrigerant connection pipe 7 is provided with the gas-side shutoff valve 27 (see FIG. 1). The bypass refrigerant pipe 61 branches off from a portion that connects the heat-source-side expansion mechanism 38 of the liquid refrigerant pipe 11d and the subcooling heat exchanger 25, and an end portion of the bypass refrigerant pipe 61 is connected to the suction pipe 11a (see FIG. 1). The bypass refrigerant pipe 61 is an example of a subcooling pipe that leads part of the refrigerant flowing through the liquid refrigerant pipe 11d to the suction side of the compressor 21. The bypass refrigerant pipe 61 is provided with the subcooling heat exchanger 25 (see FIG. 1). The bypass refrigerant pipe 61 includes a first pipe 61a that connects a branching portion from the liquid refrigerant pipe 11d and the subcooling heat exchanger 25 to each other, and a second pipe 61b that connects the subcooling heat exchanger 25 and the suction pipe 11a to each other (see FIG. 1). The first pipe 61a is provided with the bypass expansion valve 62 (see FIG. 1). Major components of the heat source unit 2 will be further described below.

(2-2-1) Compressor

The compressor 21 is a device that suctions low-pressure refrigerant in the refrigeration cycle from the suction pipe 11a, compresses the refrigerant with a compression mechanism not illustrated, and discharges the compressed refrigerant to the discharge pipe 1ib. In the present embodiment, the heat source unit 2 includes only one compressor 21. However, the number of compressors 21 is not limited to one. The heat source unit 2 may include a plurality of compressors 21 connected in parallel to each other. In the case where the heat source unit 2 compresses the refrigerant in a plurality of stages, the heat source unit 2 may include a plurality of compressors 21 connected in series with each other.

The compressor 21 is, for example, a displacement compressor of a rotary-type, a scroll-type, or the like although the type is not limited to this. The not-illustrated compression mechanism of the compressor 21 is driven by a motor 21a (see FIG. 1). As a result of the compression mechanism (not illustrated) being driven by the motor 21a, the refrigerant is compressed by the compression mechanism. In this example, the motor 21a is a motor capable of controlling the number of rotations with an inverter. As a result of the number of rotations (operating frequency) of the motor 21a being controlled, the capacity of the compressor 21 is controlled. Note that the compression mechanism of the compressor 21 may be driven by a driving mechanism (internal combustion engine, for example) other than a motor.

(2-2-2) Flow Direction Switching Mechanism

The flow direction switching mechanism 22 is a mechanism that changes, by switching the flow direction of the refrigerant, the state of the heat-source-side heat exchanger 23 between a first state in which the heat-source-side heat exchanger 23 functions as an evaporator and a second state in which the heat-source-side heat exchanger 23 functions as a condenser. When the flow direction switching mechanism 22 sets the state of the heat-source-side heat exchanger 23 in the first state, the use-side heat exchangers 42 and 52 function as condensers. In contrast, when the flow direction switching mechanism 22 sets the state of the heat-source-side heat exchanger 23 in the second state, the use-side heat exchangers 42 and 52 function as evaporators.

The flow direction switching mechanism 22 is a mechanism that switches the flow direction of the refrigerant discharged from the compressor 21 between a first flow direction A and a second flow direction B (see arrows A and B in FIG. 1). When the flow direction switching mechanism 22 switches the flow direction of the refrigerant to the first flow direction A, the state of the heat-source-side heat exchanger 23 changes to the first state. When the flow direction switching mechanism 22 switches the flow direction of the refrigerant to the second flow direction B, the state of the heat-source-side heat exchanger 23 changes to the second state.

In this example, the flow direction switching mechanism 22 is a four-way switching valve.

During the heating operation that is an example of a heater operation, the flow direction of the refrigerant discharged from the compressor 21 is switched to the first flow direction A by the flow direction switching mechanism 22. When the flow direction of the refrigerant is set in the first flow direction A, the flow direction switching mechanism 22 causes the suction pipe 11a and the first gas refrigerant pipe 11c to communicate with each other and causes the discharge pipe 11b and the second gas refrigerant pipe 11e to communicate with each other (see broken lines in the flow direction switching mechanism 22 illustrated in FIG. 1). When the refrigerant flows in the first flow direction A, the refrigerant discharged from the compressor 21 flows sequentially through the use-side heat exchangers 42 and 52, the use-side expansion mechanisms 41 and 51, the heat-source-side expansion mechanism 38, and the heat-source-side heat exchanger 23 and returns to the compressor 21 in the refrigerant circuit 10.

During the cooling operation and the defrosting operation, the flow direction of the refrigerant discharged from the compressor 21 is switched to the second flow direction B by the flow direction switching mechanism 22. When the flow direction of the refrigerant is set in the second flow direction B, the flow direction switching mechanism 22 causes the suction pipe 11a and the second gas refrigerant pipe 11e to communicate with each other and causes the discharge pipe 11b and the first gas refrigerant pipe 11c to communicate with each other (see solid lines in the flow direction switching mechanism 22 illustrated in FIG. 1). When the refrigerant flows in the second flow direction B, the refrigerant discharged from the compressor 21 flows sequentially through the heat-source-side heat exchanger 23, the heat-source-side expansion mechanism 38, the use-side expansion mechanisms 41 and 51, and the use-side heat exchangers 42 and 52 and returns to the compressor 21 in the refrigerant circuit 10.

Note that the flow direction switching mechanism 22 is not limited to a four-way switching valve. For example, the flow direction switching mechanism 22 may be configured to implement the above-described switching of the flow direction of the refrigerant by combining a plurality of electromagnetic valves and refrigerant pipes.

(2-2-3) Heat-Source-Side Heat Exchanger

At the heat-source-side heat exchanger 23, the refrigerant flowing therein exchanges heat with air (referred to as heat-source air) at an installed place of the heat source unit 2. When the heat source unit 2 is installed outdoors, the refrigerant flowing therein exchanges heat with outdoor air at the heat-source-side heat exchanger 23.

One end of the heat-source-side heat exchanger 23 is connected to the liquid refrigerant pipe 11d. Another end of the heat-source-side heat exchanger 23 is connected to the first gas refrigerant pipe 11c.

The heat-source-side heat exchanger 23 is, for example, a finned-tube heat exchanger including a heat transfer tube (not illustrated) and many fins (not illustrated) although the type is not limited to this.

The heat-source-side heat exchanger 23 functions as an evaporator during the heating operation. In contrast, the heat-source-side heat exchanger 23 functions as a condenser (radiator) during the cooling operation and the defrosting operation.

(2-2-4) Heat-Source-Side Expansion Mechanism

The heat-source-side expansion mechanism 38 is disposed between the heat-source-side heat exchanger 23 and the use-side heat exchangers 42 and 52 in a flow path of the refrigerant (see FIG. 1). Specifically, the heat-source-side expansion mechanism 38 is disposed at the liquid refrigerant pipe 11d between the heat-source-side heat exchanger 23 and the branching portion of the bypass refrigerant pipe 61 from the liquid refrigerant pipe 11d (see FIG. 1).

The heat-source-side expansion mechanism 38 adjusts the pressure and the flow rate of the refrigerant flowing through the liquid refrigerant pipe 11d. The heat-source-side expansion mechanism 38 is, for example, an electronic expansion valve with a variable opening degree. However, the heat-source-side expansion mechanism 38 is not limited to an electronic expansion valve, and a device generally used as an expansion mechanism in a refrigeration cycle apparatus may be appropriately selected.

(2-2-5) Accumulator

The accumulator 24 is a vessel having a gas-liquid separation function of separating the refrigerant flowing thereto into gas refrigerant and liquid refrigerant. The accumulator 24 is also a vessel having an accumulation function of accumulating excessive refrigerant caused depending on a change in operation loads of the use units 4 and 5. The accumulator 24 is provided at the suction pipe 11a (see FIG. 1). The refrigerant that flows into the accumulator 24 is separated into gas refrigerant and liquid refrigerant. The gas refrigerant that gathers at an upper space flows into the compressor 21.

(2-2-6) Subcooling Heat Exchanger and Bypass Expansion Valve

The subcooling heat exchanger 25 is, for example, a heat exchanger such as a double-tube-type heat exchanger or a plate-type heat exchanger. The subcooling heat exchanger 25 is provided mainly for cooling the refrigerant that has condensed in the heat-source-side heat exchanger 23 and is to be sent to the use units 4 and 5. At the subcooling heat exchanger 25, the refrigerant that branches off from the liquid refrigerant pipe 11d, flows through the bypass refrigerant pipe 61, and is decompressed by the bypass expansion valve 62 exchanges heat with the refrigerant flowing through the liquid refrigerant pipe 11d. The subcooling heat exchanger 25 is disposed between the liquid-side shutoff valve 26 and the branching portion of the bypass refrigerant pipe 61 from the liquid refrigerant pipe 11d in the liquid refrigerant pipe 11d (see FIG. 1). The subcooling heat exchanger 25 is disposed between the bypass expansion valve 62 and a connection portion of the bypass refrigerant pipe 61 and the suction pipe 11a (see FIG. 1).

The bypass expansion valve 62 is an example of a subcooling expansion valve. The bypass expansion valve 62 is provided at the first pipe 61a of the bypass refrigerant pipe 61 (see FIG. 1). The bypass expansion valve 62 decompresses the refrigerant flowing through the bypass refrigerant pipe 61. The bypass expansion valve 62 also adjusts the flow rate of the refrigerant flowing through the bypass refrigerant pipe 61. The bypass expansion valve 62 is, for example, an electronic expansion valve capable of adjusting the opening degree. However, the bypass expansion valve 62 is not limited to an electronic expansion valve capable of adjusting the opening degree and may be an electromagnetic valve capable of controlling only opening/closing. When the bypass expansion valve 62 is an electromagnetic valve capable of controlling only opening/closing, the bypass refrigerant pipe 61 is preferably provided with a capillary for flow rate adjustment.

When the bypass expansion valve 62 is open, the refrigerant branching off from the liquid refrigerant pipe 11d to the bypass refrigerant pipe 61 flows into the subcooling heat exchanger 25, and exchanges heat with the refrigerant flowing through the liquid refrigerant pipe 11d to absorb heat and become gas-phase refrigerant. The gas-phase refrigerant then flows into the suction pipe 11a. In contrast, the refrigerant that has exchanged heat with the refrigerant flowing through the bypass refrigerant pipe 61 at the subcooling heat exchanger 25 and flows through the liquid refrigerant pipe 11d is cooled at the subcooling heat exchanger 25 and is sent to the use units 4 and 5.

(2-2-7) Liquid-Side Shutoff Valve and Gas-Side Shutoff Valve

The liquid-side shutoff valve 26 is a valve provided at the connection portion of the liquid refrigerant pipe 11d and the liquid refrigerant connection pipe 6. The gas-side shutoff valve 27 is a valve provided at the connection portion of the second gas refrigerant pipe 11e and the gas refrigerant connection pipe 7. The liquid-side shutoff valve 26 and the gas-side shutoff valve 27 are, for example, manually operable valves.

(2-2-8) Heat-Source-Side Fan

The heat-source-side fan 28 is a fan for taking the heat-source air outside the heat source unit 2 to the heat source unit 2, supplying the heat-source air to the heat-source-side heat exchanger 23, and discharging the air that has exchanged heat with the refrigerant at the heat-source-side heat exchanger 23 to outside the heat source unit 2.

The heat-source-side fan 28 is, for example, a propeller fan. However, the type of the heat-source-side fan 28 is not limited to a propeller fan, and may be appropriately selected.

The heat-source-side fan 28 is driven by the motor 28a (see FIG. 1). The motor 28a is, but not limited to, a motor capable of controlling the number of rotations with an inverter. The heat-source-side fan 28 is a fan with an airflow that is variable through control of the number of rotations of the motor 28a.

(2-2-9) Sensors

The heat source unit 2 is provided with various sensors. For example, the heat source unit 2 includes temperature sensors and pressure sensors below. Types of the temperature sensors and the pressure sensors may be appropriately selected.

The sensors of the heat source unit 2 include a suction pressure sensor 29, a discharge pressure sensor 30, a suction temperature sensor 31, a discharge temperature sensor 32, a heat exchanger temperature sensor 33, a liquid-side temperature sensor 34, a liquid-pipe temperature sensor 35, a heat-source-air temperature sensor 36, a heat-source-air humidity sensor 39, and a bypass temperature sensor 63 (see FIGS. 1 and 2). Note that the heat source unit 2 need not include all the aforementioned sensors 29 to 36, 39, and 63 and may include only at least one of them. The heat source unit 2 may also include a sensor other than the aforementioned sensors 29 to 36, 39, and 63.

The suction pressure sensor 29 is disposed at the suction pipe 11a (see FIG. 1). The suction pressure sensor 29 is a sensor that measures a suction pressure Ps. The suction pressure Ps is a value of a low pressure of the refrigeration cycle. The discharge pressure sensor 30 is disposed at the discharge pipe 11b (see FIG. 1). The discharge pressure sensor 30 is a sensor that measures a discharge pressure Pd. The discharge pressure Pd is a value of a high pressure of the refrigeration cycle. The suction temperature sensor 31 is disposed at the suction pipe 11a (see FIG. 1). The suction temperature sensor 31 is a sensor that measures a suction temperature Ts. The discharge temperature sensor 32 is disposed at the discharge pipe 11b (see FIG. 1). The discharge temperature sensor 32 is a sensor that measures a discharge temperature Td. The heat exchanger temperature sensor 33 is disposed at the heat-source-side heat exchanger 23 (see FIG. 1). The heat exchanger temperature sensor 33 measures a temperature of the refrigerant flowing through the heat-source-side heat exchanger 23. The heat exchanger temperature sensor 33 measures a refrigerant temperature corresponding to a condensation temperature Tc during the cooling operation and measures a refrigerant temperature corresponding to an evaporation temperature Te during the heating operation. The liquid-side temperature sensor 34 is disposed on the liquid side of the heat-source-side heat exchanger 23 and measures a refrigerant temperature Tb. When the flow direction switching mechanism 22 switches the flow direction of the refrigerant to the second flow direction B, a degree of subcooling of the refrigeration cycle is calculated by subtracting the refrigerant temperature Tb measured by the liquid-side temperature sensor 34 from the condensation temperature Tc measured by the heat exchanger temperature sensor 33. The liquid-pipe temperature sensor 35 is disposed between the subcooling heat exchanger 25 and the liquid-side shutoff valve 26 at the liquid refrigerant pipe 11d. The liquid-pipe temperature sensor 35 is an example of a first temperature sensor. The liquid-pipe temperature sensor 35 measures a temperature (liquid pipe temperature Tlp) of the refrigerant flowing through the liquid refrigerant pipe 11d between the subcooling heat exchanger 25 and the liquid-side shutoff valve 26. When the flow direction switching mechanism 22 switches the flow direction of the refrigerant to the second flow direction B and the bypass expansion valve 62 is open, the liquid-pipe temperature sensor 35 measures, as the liquid pipe temperature Tlp, a temperature of the refrigerant that has been cooled at the subcooling heat exchanger 25 and flows through the liquid refrigerant pipe 11d. For example, during an amount-of-refrigerant determination operation, the liquid-pipe temperature sensor 35 measures, as the liquid pipe temperature Tlp, a temperature of the refrigerant that has passed through the subcooling heat exchanger 25 and flows through the liquid refrigerant pipe 11d. The heat-source-air temperature sensor 36 measures a temperature of the heat-source air. The heat-source-air humidity sensor 39 measures a humidity of the heat-source air. The bypass temperature sensor 63 is disposed at the second pipe 61b of the bypass refrigerant pipe 61. The bypass temperature sensor 63 measures a temperature of the refrigerant that flows through the first pipe 61a of the bypass refrigerant pipe 61, exchanges heat with the refrigerant flowing through the liquid refrigerant pipe 11d at the subcooling heat exchanger 25, and flows to the suction pipe 11a.

(2-2-10) Heat-Source-Side Control Unit

The heat-source-side control unit 37 controls operations of the individual components of the heat source unit 2.

The heat-source-side control unit 37 includes a microcomputer, a memory, and so on that are provided to control the heat source unit 2.

The heat-source-side control unit 37 is electrically connected to the compressor 21, the flow direction switching mechanism 22, the heat-source-side expansion mechanism 38, the bypass expansion valve 62, the heat-source-side fan 28, the suction pressure sensor 29, the discharge pressure sensor 30, the suction temperature sensor 31, the discharge temperature sensor 32, the heat exchanger temperature sensor 33, the liquid-side temperature sensor 34, the liquid-pipe temperature sensor 35, the heat-source-air temperature sensor 36, the heat-source-air humidity sensor 39, and the bypass temperature sensor 63 of the heat source unit 2 so as to be able to transmit and receive control signals and information (see FIG. 1). The heat-source-side control unit 37 is also connected to the use-side control units 47 and 57 of the use units 4 and 5 by the transmission line 8a in a state in which the heat-source-side control unit 37 can transmit and receive control signals and the like to and from the use-side control units 47 and 57.

The heat-source-side control unit 37 and the use-side control units 47 and 57 of the use units 4 and 5 are connected through the transmission line 8a and function as the controller 8 that controls operations of the refrigeration cycle apparatus 1. The controller 8 controls operations of the entire refrigeration cycle apparatus 1 as a result of a microcomputer of at least one of the heat-source-side control unit 37, the use-side control unit 47, and the use-side control unit 57 executing a program stored in a memory. The controller 8 also functions as a refrigerant leakage determining unit 85 that determines leakage of refrigerant in the refrigerant circuit 10 of the refrigeration cycle apparatus 1. Functions of the controller 8 will be described below.

(2-3) Connection Pipes

The refrigeration cycle apparatus 1 includes, as connection pipes, the liquid refrigerant connection pipe 6 and the gas refrigerant connection pipe 7. The liquid refrigerant connection pipe 6 and the gas refrigerant connection pipe 7 are pipes installed at an installation site of the refrigeration cycle apparatus 1 at the time of installation of the refrigeration cycle apparatus 1. As the liquid refrigerant connection pipe 6 and the gas refrigerant connection pipe 7, pipes having various lengths and diameters are used depending on installation conditions such as an installed place and a combination of heat source units and use units.

The use-side refrigerant circuits 10a and 10b of the use units 4 and 5 and the heat-source-side refrigerant circuit 10c of the heat source unit 2 are connected by the liquid refrigerant connection pipe 6 and the gas refrigerant connection pipe 7. Consequently, the refrigerant circuit 10 of the refrigeration cycle apparatus 1 is formed.

(2-4) Controller

The controller 8 is constituted by the heat-source-side control unit 37 of the heat source unit 2 and the use-side control units 47 and 57 of the use units 4 and 5 connected to each other through the transmission line 8a so as to be able to perform communication. The controller 8 controls operations of the entire refrigeration cycle apparatus 1 as a result of microcomputers of the heat-source-side control unit 37 and the use-side control units 47 and 57 executing programs stored in respective memories.

The controller 8 also functions as the refrigerant leakage determination system 100 that determines leakage of refrigerant in the refrigerant circuit 10 of the refrigeration cycle apparatus 1. Functions of the refrigerant leakage determination system 100 will be described below separately from description of the refrigeration cycle apparatus 1.

Note that the controller 8 in the present embodiment is merely an example. A controller having functions substantially the same as the functions of the controller 8 in the present embodiment may be implemented by hardware such as a logic circuit, or may be implemented by a combination of hardware and software.

In this example, the heat-source-side control unit 37 and the use-side control units 47 and 57 constitute the controller 8. However, the configuration is not limited to this. For example, in addition to the heat-source-side control unit 37 and the use-side control units 47 and 57 or in place of the heat-source-side control unit 37 and the use-side control units 47 and 57, the refrigeration cycle apparatus 1 may include a control device that is provided separately from the heat source unit 2 and the use units 4 and 5 and implements some or all of the functions of the controller 8 described below.

The controller 8 of the refrigeration cycle apparatus 1 need not have some or all of the functions described below. For example, some or all of the functions of the controller 8 described below may be implemented by a server or the like installed at a place different from that of the refrigeration cycle apparatus 1. In other words, the functions of the controller 8 need not be performed only by the refrigeration cycle apparatus 1 and may be implemented by a not-illustrated server or the like installed separately from the refrigeration cycle apparatus 1. For example, functions of the refrigerant leakage determination system 100 described below may be implemented by a server installed separately from the refrigeration cycle apparatus 1.

As illustrated in FIG. 2, the controller 8 is electrically connected to various devices of the heat source unit 2 and the use units 4 and 5, including the use-side expansion mechanisms 41 and 51, the compressor 21, the flow direction switching mechanism 22, the heat-source-side expansion mechanism 38, the bypass expansion valve 62, the use-side fans 43 and 53, and the heat-source-side fan 28. As illustrated in FIG. 2, the controller 8 is also electrically connected to the liquid-side temperature sensors 44 and 54, the gas-side temperature sensors 45 and 55, the target space temperature sensors 46 and 56, the suction pressure sensor 29, the discharge pressure sensor 30, the suction temperature sensor 31, the discharge temperature sensor 32, the heat exchanger temperature sensor 33, the liquid-side temperature sensor 34, the liquid-pipe temperature sensor 35, the heat-source-air temperature sensor 36, the heat-source-air humidity sensor 39, and the bypass temperature sensor 63.

The controller 8 includes a device control unit 81 as a functional unit.

In the device control unit 81, the controller 8 controls operations of the devices 21, 22, 28, 38, 41, 43, 51, 53, 62, and so on, based on measurement signals from the various sensors 29 to 36, 39, 44 to 46, 54 to 56, and 63 and instructions or the like transmitted from not-illustrated remote controls to the use-side control units 47 and 57. Control of operations of the devices 21, 22, 28, 38, 41, 43, 51, 53, and 62 performed by the device control unit 81 during the cooling operation, the heating operation, and the defrosting operation will be described below.

(3) Operations of Refrigeration Cycle Apparatus

Operations of the refrigeration cycle apparatus 1 in the cooling mode, the heating mode, and defrosting mode will be described.

(3-1) Operation in Cooling Mode

In response to an instruction for causing the refrigeration cycle apparatus 1 to perform the cooling operation from the remote control (not illustrated), the controller 8 sets the operating mode of the refrigeration cycle apparatus 1 to the cooling mode. The device control unit 81 controls the flow direction switching mechanism 22 to be in a state indicated by the solid lines illustrated in FIG. 1 so that the state of the heat-source-side heat exchanger 23 changes to the first state in which the heat-source-side heat exchanger 23 functions as a condenser, and causes the compressor 21, the heat-source-side fan 28, and the use-side fans 43 and 53 to operate.

The device control unit 81 then controls the devices of the refrigeration cycle apparatus 1, for example, in the following manner during the cooling operation.

The device control unit 81 sets an electronic expansion valve, which is an example of the heat-source-side expansion mechanism 38, in a fully-open state.

The device control unit 81 adjusts the opening degrees of electronic expansion valves, which are an example of the use-side expansion mechanisms 41 and 51, such that the degree of superheating SHr of the refrigerant at a gas-side outlet of each of the use-side heat exchangers 42 and 52 becomes equal to a predetermined target value SHrs. The degrees of superheating SHr of the refrigerant at the gas-side outlets of the use-side heat exchangers 42 and 52 are calculated, for example, by subtracting an evaporation temperature Te converted from a measured value (suction pressure Ps) of the suction pressure sensor 29 from measured values of the gas-side temperature sensors 45 and 55, respectively. The degrees of superheating SHr of the refrigerant may be calculated by subtracting the measured values of the liquid-side temperature sensors 44 and 54 equivalent to the evaporation temperature Te from the measured values of the gas-side temperature sensors 45 and 55, respectively.

The device control unit 81 adjusts the opening degree of the bypass expansion valve 62 such that a degree of superheating SHb of the refrigerant at an outlet of the subcooling heat exchanger 25 closer to the bypass refrigerant pipe 61 becomes equal to a predetermined target value SHbs. The degree of superheating SHb of the refrigerant at the outlet of the subcooling heat exchanger 25 closer to the bypass refrigerant pipe 61 is calculated, for example, by subtracting an evaporation temperature Te calculated from a measured value (suction pressure Ps) of the suction pressure sensor 29 from a measured value of the bypass temperature sensor 63.

The device control unit 81 controls an operating capacity of the compressor 21 such that the evaporation temperature Te equivalent to the measured value (suction pressure Ps) of the suction pressure sensor 29 approaches a target evaporation temperature Tes. The operating capacity of the compressor 21 is controlled by controlling the number of rotations of the motor 21a.

As a result of the operations of the devices being controlled in the above manner, the refrigerant flows through the refrigerant circuit 10 in the following manner during the cooling operation.

In response to the start of the compressor 21, low-pressure gas refrigerant in the refrigeration cycle is suctioned by the compressor 21 and is compressed by the compressor 21 so as to become high-pressure gas refrigerant in the refrigeration cycle. The high-pressure gas refrigerant is sent to the heat-source-side heat exchanger 23 through the flow direction switching mechanism 22, and exchanges heat with heat-source air supplied by the heat-source-side fan 28 so as to condense and become high-pressure liquid refrigerant. The high-pressure liquid refrigerant flows through the liquid refrigerant pipe 11d and passes through the heat-source-side expansion mechanism 38. Part of the refrigerant that has passed through the heat-source-side expansion mechanism 38 flows into the bypass refrigerant pipe 61. The refrigerant that has flowed into the subcooling heat exchanger 25 from the liquid refrigerant pipe 11d exchanges, at the subcooling heat exchanger 25, heat with the refrigerant that flows through the bypass refrigerant pipe 61, is decompressed by the bypass expansion valve 62 to have a pressure around a suction pressure of the compressor 21, and flows into the subcooling heat exchanger 25, so as to be in a subcooling state. The high-pressure liquid refrigerant in the subcooling state is sent to the use units 4 and 5 through the liquid refrigerant connection pipe 6. On the other hand, the refrigerant that has flowed through the bypass refrigerant pipe 61 and has exchanged heat with the refrigerant flowing through the liquid refrigerant pipe 11d at the subcooling heat exchanger 25 is returned to the suction side of the compressor 21. The high-pressure liquid refrigerant sent to the use units 4 and 5 is decompressed to have a pressure around the suction pressure of the compressor 21 at the use-side expansion mechanisms 41 and 51 so as to become a gas-liquid two-phase state and is sent to the use-side heat exchangers 42 and 52, respectively. The refrigerant in the gas-liquid two-phase state exchanges, at the use-side heat exchangers 42 and 52, heat with air in a target space that is supplied to the use-side heat exchangers 42 and 52 by the use-side fans 43 and 53 so as to evaporate and become low-pressure gas refrigerant. The low-pressure gas refrigerant is sent to the heat source unit 2 through the gas refrigerant connection pipe 7 and flows into the accumulator 24 through the flow direction switching mechanism 22. The low-pressure gas refrigerant that has flowed into the accumulator 24 is suctioned by the compressor 21 again. On the other hand, the temperature of the air supplied to the use-side heat exchangers 42 and 52 decreases as a result of exchanging heat with the refrigerant flowing through the use-side heat exchangers 42 and 52, and the air cooled at the use-side heat exchangers 42 and 52 is blown out to the target space, respectively.

(3-2) Operation in Heating Mode

In response to an instruction for causing the refrigeration cycle apparatus 1 to perform the heating operation from the remote control (not illustrated), the controller 8 sets the operating mode of the refrigeration cycle apparatus 1 to the heating mode. When the operating mode of the refrigeration cycle apparatus 1 is set in the heating mode, the device control unit 81 controls the flow direction switching mechanism 22 to be in a state indicated by the broken lines illustrated in FIG. 1 such that the state of the heat-source-side heat exchanger 23 changes to the second state in which the heat-source-side heat exchanger 23 functions as an evaporator. The device control unit 81 also causes the compressor 21, the heat-source-side fan 28, and the use-side fans 43 and 53 to operate during the heating operation.

The device control unit 81 controls the devices of the refrigeration cycle apparatus 1, for example, in the following manner during the heating operation.

The device control unit 81 adjusts the opening degrees of electronic expansion valves, which are an example of the use-side expansion mechanisms 41 and 51, such that a degree of subcooling SCr of the refrigerant at a liquid-side outlet of each of the use-side heat exchangers 42 and 52 becomes equal to a predetermined target value SCrs. The degrees of subcooling SCr of the refrigerant at the liquid-side outlets of the use-side heat exchangers 42 and 52 are calculated, for example, by subtracting measured values of the liquid-side temperature sensors 44 and 54 from a condensation temperature Tc converted from a measured value (discharge pressure Pd) of the discharge pressure sensor 30, respectively.

The device control unit 81 adjusts the opening degree of the heat-source-side expansion mechanism 38 such that the refrigerant that flows into the heat-source-side heat exchanger 23 is decompressed to have a pressure (condensation pressure Pe) enabling the refrigerant to evaporate at the heat-source-side heat exchanger 23.

The device control unit 81 controls an operating capacity of the compressor 21 such that the condensation temperature Tc corresponds to the measured value (discharge pressure Pd) of the discharge pressure sensor 30 approaches a target evaporation temperature Tcs. The operating capacity of the compressor 21 is controlled by controlling the number of rotations of the motor 21a.

As a result of the operations of the devices being controlled in the above manner, the refrigerant flows through the refrigerant circuit 10 in the following manner during the heating operation.

In response to the start of the compressor 21, low-pressure gas refrigerant in the refrigeration cycle is suctioned by the compressor 21 and is compressed by the compressor 21 so as to become high-pressure gas refrigerant in the refrigeration cycle. The high-pressure gas refrigerant is sent to the use-side heat exchangers 42 and 52 through the flow direction switching mechanism 22, and exchanges heat with air in a target space supplied by the use-side fans 43 and 53 so as to condense and become high-pressure liquid refrigerant, respectively. The temperature of the air supplied to the use-side heat exchangers 42 and 52 increases as result of exchanging heat with the refrigerant flowing through the use-side heat exchangers 42 and 52, and the air heated at the use-side heat exchangers 42 and 52 are blown out to the target space. The high-pressure liquid refrigerant that has passed through the use-side heat exchangers 42 and 52 passes through the use-side expansion mechanisms 41 and 51 and are decompressed, respectively. The refrigerant decompressed at the use-side expansion mechanisms 41 and 51 is sent to the heat source unit 2 through the liquid refrigerant connection pipe 6 and flows into the liquid refrigerant pipe 11d. The refrigerant flowing through the liquid refrigerant pipe 11d is decompressed to have a pressure around the suction pressure of the compressor 21 when the refrigerant passes through the heat-source-side expansion mechanism 38 so as to become the refrigerant of the gas-liquid two-phase state. The refrigerant then flows into the heat-source-side heat exchanger 23. The low-pressure refrigerant in the gas-liquid two-phase state that has flowed into the heat-source-side heat exchanger 23 exchanges heat with heat-source air supplied by the heat-source-side fan 28 so as to evaporate and become low-pressure gas refrigerant. The low-pressure gas refrigerant flows into the accumulator 24 through the flow direction switching mechanism 22. The low-pressure gas refrigerant that has flowed into the accumulator 24 is suctioned by the compressor 21 again.

(3-3) Operation in Defrosting Mode

In response to determining that a predetermined defrosting start condition is satisfied when the operating mode of the refrigeration cycle apparatus 1 is the heating mode, the device control unit 81 controls the flow direction switching mechanism 22 so as to temporarily switch the state of the heat-source-side heat exchanger 23 to the second state, and sets the operating mode to the defrosting mode. The defrosting operation is an operation for melting and removing frost attached onto the heat-source-side heat exchanger 23 in the heating mode.

Note that the defrosting start condition is a condition for which defrosting of the heat-source-side heat exchanger 23 is desirably performed when the condition is satisfied. For example, when the refrigerant temperature measured by the heat exchanger temperature sensor 33 becomes lower than or equal to a predetermined temperature, the device control unit 81 determines that the defrosting start condition is satisfied. The predetermined temperature of the refrigerant temperature used as a threshold for determining whether the defrosting start condition is satisfied is, for example, −5° C. The device control unit 81 may also determine that the defrosting start condition is satisfied when duration of the heating operation exceeds a predetermined period.

The device control unit 81 controls the devices of the refrigeration cycle apparatus 1, for example, in the following manner during the defrosting operation.

Before starting the defrosting operation, the device control unit 81 temporarily stops the compressor 21. Alternatively, before starting the defrosting operation, the device control unit 81 reduces the number of rotations of the compressor 21. Subsequently, at a predetermined timing, the device control unit 81 switches the flow direction switching mechanism 22 from the state of the heating operation to a state similar to that of the cooling operation, and causes the compressor 21 to operate at a predetermined number of rotations (starts the defrosting operation). The device control unit 81 controls the number of rotations of the compressor 21 to be relatively high in order to melt the frost on the heat-source-side heat exchanger 23. During the defrosting operation, the device control unit 81 controls the heat-source-side fan 28 to have a predetermined airflow smaller than the maximum airflow. During the defrosting operation, the device control unit 81 stops the use-side fans 43 and 53. The device control unit 81 adjusts the heat-source-side expansion mechanism 38 and the use-side expansion mechanisms 41 and 51 to be substantially fully open immediately after the start of the defrosting operation, and then appropriately adjusts the opening degrees of the expansion mechanisms 38, 41, and 51.

When determining that a defrosting end condition is satisfied during the defrosting operation, the device control unit 81 determines to end the defrosting operation and restores the heating operation. For example, the device control unit 81 determines that the defrosting end condition is satisfied when the refrigerant temperature measured by the heat exchanger temperature sensor 33 becomes higher than or equal to a predetermined end determination temperature and the state continues for a predetermined period or longer. Note that the defrosting end condition is not limited to the condition mentioned above. For example, the device control unit 81 may determine that the defrosting end condition is satisfied immediately after the refrigerant temperature measured by the heat exchanger temperature sensor 33 becomes higher than or equal to the predetermined end determination temperature.

(4) Refrigerant Leakage Determination System

The controller 8 functions as the refrigerant leakage determination system 100 when the heating mode as the normal mode is selected in the refrigeration cycle apparatus 1. In the present embodiment, the controller 8 functions as the refrigerant leakage determination system 100 in winter, for example.

The controller 8 includes, as functional units for the refrigerant leakage determination system 100, a defrosting information acquiring unit 82, a defrosting period information acquiring unit 83, an operation condition acquiring unit 84, the refrigerant leakage determining unit 85, a reference value calculating unit 86, and a storage unit 90.

(4-1) Defrosting Information Acquiring Unit

The defrosting information acquiring unit 82 is a functional unit that acquires defrosting information.

The defrosting information is information regarding a relationship between a heating operation period for which the refrigeration cycle apparatus 1 operates in the heating mode and the number of defrosting operations in which the refrigeration cycle apparatus 1 operates in the defrosting mode. The heating operation period is an example of a normal operation period.

The defrosting information is, for example, operation history data of the refrigeration cycle apparatus 1. Specifically, the defrosting information is data from which the date and time of a heating operation performed by the refrigeration cycle apparatus 1 and the date and time of a defrosting operation performed by the refrigeration cycle apparatus 1 are recognizable.

In another example, the defrosting information is data of the heating operation period and the number of defrosting operations performed by the refrigeration cycle apparatus 1. Specifically, the defrosting information is data of a heating operation period and the number of defrosting operations in each time slot of each date. For example, the defrosting information is data indicating that the heating operation period is "50 minutes" and the number of defrosting operations is "twice" "from 9 o'clock to 10 o'clock on Jan. 10, 2018".

In another example, the defrosting information is data of a frequency of the defrosting operations of the refrigeration cycle apparatus 1. Specifically, the defrosting information is a value obtained by dividing the number of defrosting operations by the heating operation period in each time slot of each date. For example, the defrosting information is data of "2.4 times/hour", which is obtained by dividing the number of defrosting operations (for example, twice) by the heating operation period (for example, "5/6 hours") "from 9 o'clock to 10 o'clock on Jan. 10, 2018".

In addition, when the heating operation period of the refrigeration cycle apparatus 1 per day can be estimated, the defrosting information may be the number of defrosting operations per day.

In the present embodiment, the defrosting information acquiring unit 82 acquires the defrosting information exemplified above from the device control unit 81. The information acquired by the defrosting information acquiring unit 82 is stored in the storage unit 90.

(4-2) Defrosting Period Information Acquiring Unit The defrosting period information acquiring unit 83 acquires defrosting period information regarding a period of each defrosting operation in which the refrigeration cycle apparatus 1 operates in the defrosting mode. The period of a defrosting operation is, for example, a period from the start of the defrosting operation until the defrosting end condition is satisfied.

The defrosting period information is, for example, operation history data of the refrigeration cycle apparatus 1. Specifically, the defrosting period information is data from which the date and time of the defrosting operation performed by the refrigeration cycle apparatus 1 is recognizable.

In another example, the defrosting period information is a period of each defrosting operation. Specifically, the defrosting period information is data of a start date and time of a defrosting operation and a period of the defrosting operation started at the date and time.

In another example, the defrosting period information is an average value of periods of individual defrosting operations in each time slot of each date. Specifically, the defrosting period information is data of "5 minutes/time", which is obtained by dividing the sum (for example, 10 minutes) of the periods of the defrosting operations performed between 9 o'clock and 10 o'clock on Jan. 10, 2018 by the number of defrosting operations (for example, twice) in that time slot.

In the present embodiment, the defrosting period information acquiring unit 83 acquires the defrosting period information described above from the device control unit 81. The information acquired by the defrosting period information acquiring unit 83 is stored in the storage unit 90.

(4-3) Operation Condition Acquiring Unit

The operation condition acquiring unit 84 acquires an operation condition including at least one of a temperature of air that exchanges heat in the heat-source-side heat exchanger 23, a humidity of the air that exchanges heat in the heat-source-side heat exchanger 23, and the number of rotations of the compressor 21 (the number of rotations of the motor 21a) when the refrigeration cycle apparatus 1 is in operation in the heating mode. In the present embodiment, the operation condition acquiring unit 84 acquires, as the operation condition, all of the temperature and humidity of the heat-source air that exchanges heat in the heat-source-side heat exchanger 23 and the number of rotations of the compressor 21 when the refrigeration cycle apparatus 1 is in operation in the heating mode.

For example, the operation condition acquiring unit 84 acquires data of the temperature and humidity of the heat-source air and data of the number of rotations of the compressor 21 at a predetermined time interval (one minute, for example).

In another example, the operation condition acquiring unit 84 acquires, for each time slot of each date, data of an average temperature and an average humidity of the heat-source air and an average number of rotations of the compressor 21 during a heating operation of the refrigeration cycle apparatus 1.

As for the temperature and humidity of the heat-source air, the operation condition acquiring unit 84 acquires, for example, a measured value of the heat-source-air temperature sensor 36 and a measured value of the heat-source-air humidity sensor 39 as the temperature and the humidity of the heat-source air, respectively. In another example, the operation condition acquiring unit 84 may acquire, as the temperature and humidity of the heat-source air, a temperature and a humidity at an area where the refrigeration cycle apparatus 1 is installed from a server (not illustrated) that is connected via a network such as the Internet and distributes weather information.

The operation condition acquiring unit 84 acquires data of the number of rotations of the compressor 21 from the device control unit 81. In another example, the operation condition acquiring unit 84 may acquire the number of rotations of the compressor 21, based on a measured value of an ammeter (not illustrated) that measures an current supplied to the compressor 21 or a measured value of a wattmeter (not illustrated) that measures an electric power supplied to the compressor 21.

The information acquired by the operation condition acquiring unit 84 is stored in the storage unit 90.

(4-4) Storage Unit

The storage unit 90 stores the defrosting information. The storage unit 90 stores the defrosting period information. The storage unit 90 stores the operation condition.

The storage unit 90 preferably stores the defrosting information and the operation condition in association with each other. For example, in the case where the defrosting information is information regarding the date and time of a heating operation performed by the refrigeration cycle apparatus 1 and the date and time of a defrosting operation performed by the refrigeration cycle apparatus 1, the defrosting information and the operation conditions are preferably stored in the storage unit 90 so that the operation conditions used on those dates and times can be grasped. For example, in the case where the defrosting information is data on the heating operation period and the number of defrosting operations in each time slot of each date, the operation condition is also stored in the storage unit 90 preferably for each time slot of each date.

The storage unit 90 preferably stores the defrosting period information and the operation condition in association with each other.

The storage unit 90 also stores a reference value (a reference value for a first value) and reference periods (a first defrosting period t1 and a second defrosting period t2) that are used by the refrigerant leakage determining unit 85 in determination. What values are stored as the reference values in the storage unit 90 will be described below.

Note that the storage unit 90 preferably stores in advance, as initial values, reference values derived using a test machine of the refrigeration cycle apparatus 1 or theoretically calculated reference values. The reference values stored in the storage unit 90 are preferably updated with reference values calculated by the reference value calculating unit 86 described below.

(4-5) Refrigerant Leakage Determining Unit

Based on the defrosting information stored in the storage unit 90, the refrigerant leakage determining unit 85 determines leakage of the refrigerant in the refrigerant circuit 10 of the refrigeration cycle apparatus 1.

The refrigerant leakage determining unit 85 determines leakage of the refrigerant in the following manner, for example.

In response to storage of a predetermined amount of defrosting information in the storage unit 90, the refrigerant leakage determining unit 85 calculates, as a first value, a value serving as an index of a frequency of the defrosting operations relative to a heating operation period. For example, when defrosting information for a predetermined period are stored in the storage unit 90, the refrigerant leakage determining unit 85 calculates, as the first value, a value serving as the index of the frequency of the defrosting operations relative to the heating operation period. The predetermined period is, for example, one month. However, the predetermined period is not limited to this and may be a period shorter than one month or a period longer than one month.

The value serving as the index of the frequency of the defrosting operations relative to the heating operation period is, for example, a value obtained by dividing the total number of defrosting operations in the predetermined period by the total heating operation period in the predetermined period. The value serving as the index of the frequency of the defrosting operations relative to the heating operation period may be, for example, the number of defrosting operations relative to a predetermined heating operation period.

Note that the frequency of the defrosting operations increases as the temperature of the heat-source air decreases. The frequency of the defrosting operations increases as the humidity of the heat-source air increases. The frequency of the defrosting operations increases as the number of rotations of the compressor 21 increases, that is, as the heating load increases. Accordingly, the refrigerant leakage determining unit 85 preferably corrects (weights) the number of defrosting operations using the operation condition when calculating the value serving as the index of the frequency of the defrosting operations by dividing the total number of defrosting operations in the predetermined period by the total heating operation period in the predetermined period, for example. For example, if a defrosting operation is performed under a condition where the temperature of the heat-source air is lower than a predetermined reference temperature and the frequency of the defrosting operations tends to increase, the refrigerant leakage determining unit 85 sets a count for the defrosting operation to be less than 1, for example, 0.9. For example, if a defrosting operation is performed under a condition where the temperature of the heat-source air is higher than a predetermined reference temperature and the frequency of the defrosting operations tends to decrease, the refrigerant leakage determining unit 85 sets a count for the defrosting operation to be greater than 1, for example, 1.1. The number of defrosting operations may be corrected in accordance with the humidity of the heat-source air and the number of rotations of the compressor 21 in the similar manner. An influence of the operation condition on calculation of the index of the frequency of the defrosting operations can be suppressed by such a correction of the number of defrosting operations based on the operation condition. Note that the degree of correction depending on a difference in the operation condition may be determined based on, for example, a test conducted using a test machine of the refrigeration cycle apparatus 1 or may be theoretically determined.

In another example, the value serving as the index of the frequency of the defrosting operations relative to the heating operation period, which is calculated as the first value, may be, for example, a value of a slope and an intercept of an approximate straight line (see FIGS. 11 and 12) obtained by plotting, in a graph with a horizontal axis assigned any one of the operation conditions (for example, the temperature of the heat-source air during the heating operation) and a vertical axis assigned the frequency of the defrosting operations relative to the heating operation period, the frequency of the defrosting operations relative to the heating operation period under the operation condition. The use of such a value as the value serving as the index of the frequency of the defrosting operations relative to the heating operation period enables the value serving as the index of the frequency of the defrosting operations relative to the heating operation period to be calculated such that correction is applied in terms of the operation condition used for the horizontal axis (without weighting the number of defrosting operations).

When a predetermined amount of defrosting information is stored in the storage unit 90, the refrigerant leakage determining unit 85 may calculate, as the first value, a value serving as an index of a change in the frequency of the defrosting operations relative to the heating operation period instead of the value serving as the index of the frequency of the defrosting operations relative to the heating operation period. For example, when the defrosting information for a predetermined period (one month, for example) is stored in the storage unit 90, the refrigerant leakage determining unit 85 calculates, as the index serving as the change in the frequency of the defrosting operations relative to the heating operation period, a slope of an approximate straight line (see FIG. 13) obtained by plotting the data in a graph with a horizontal axis assigned a cumulative heating operation period and a vertical axis assigned the total number of defrosting operations. The refrigerant leakage determining unit 85 preferably corrects the number of defrosting operations based on the operation condition also in the case of calculating the value serving as the index of the change in the frequency of the defrosting operations relative to the heating operation period.

After calculating the first value in the above manner, the refrigerant leakage determining unit 85 compares the first value with a reference value stored in the storage unit 90. The reference value is a value corresponding to the first value, and is the first value obtained when the refrigeration cycle apparatus 1 operates with an appropriate amount of refrigerant being charged in the refrigerant circuit 10. A specific example is that, if the first value is a value obtained by dividing the total number of defrosting operations in the predetermined period by the total heating operation period in the predetermined period, the reference value is a value obtained by dividing the total number of defrosting operations by the cumulative heating operation period for the refrigeration cycle apparatus 1 operating with an appropriate amount of refrigerant being charged in the refrigerant circuit 10.

For example, when the first value to be calculated is a value obtained by dividing the total number of defrosting operations in the predetermined period by the total heating operation period in the predetermined period, the refrigerant leakage determining unit 85 determines that the refrigerant is leaking from the refrigerant circuit 10 if the first value is greater than the reference value by a predetermined amount or more. A reason why the value obtained by dividing the total number of defrosting operations in the predetermined period by the total heating operation period in the predetermined period increases if the refrigerant leaks from the refrigerant circuit 10 is as follows. If an amount of refrigerant decreases during a heating operation, the degree of superheating tends to occur at the heat-source-side heat exchanger 23 functioning as an evaporator, and heat exchange performance decreases in a superheating region. Consequently, the low pressure in the refrigeration cycle decreases. When the low pressure in the refrigeration cycle decreases, the heat-source-side heat exchanger 23 is more easily frosted. Consequently, the frequency of the defrosting operations tends to increase in the refrigeration cycle apparatus 1.

Preferably, the refrigerant leakage determining unit 85 determines, based further on the defrosting period information, leakage of the refrigerant in the refrigerant circuit 10 of the refrigeration cycle apparatus 1. If the refrigerant leaks from the refrigerant circuit 10 and the amount of refrigerant decreases, a manner in which the heat-source-side heat exchanger 23 functioning as an evaporator is frosted and defrosted changes. The refrigerant leakage determining unit 85 determines leakage of the refrigerant in the refrigerant circuit 10 of the refrigeration cycle apparatus 1, based on a change in the defrosting period caused by such a change in the manner of frosting and defrosting.

For example, the storage unit 90 stores the first defrosting period t1 and the second defrosting period t2. The first defrosting period t1 is a period of the defrosting operation when the refrigeration cycle apparatus 1 operates with an appropriate amount of refrigerant being charged in the refrigerant circuit 10. The second defrosting period t2 is a period of the defrosting operation when the refrigeration cycle apparatus 1 operates in a state in which the amount of refrigerant in the refrigerant circuit 10 is less than the appropriate amount of refrigerant. The refrigerant leakage determining unit 85 determines leakage of the refrigerant in the refrigerant circuit 10 of the refrigeration cycle apparatus 1 by comparing the defrosting period information acquired by the defrosting period information acquiring unit 83 and stored in the storage unit 90 with the first defrosting period t1 and the second defrosting period t2. The period of the defrosting operation is influenced by the operation condition during the heating operation prior to the defrosting operation, the temperature of the heat-source air during the defrosting operation, or the like. Therefore, the defrosting period information is preferably corrected based on the operation condition during the heating operation prior to the defrosting operation, the temperature of the heat-source air during the defrosting operation, or the like.

The refrigerant leakage determining unit 85 can accurately determine leakage of the refrigerant by determining leakage of the refrigerant from the refrigerant circuit 10 based on the defrosting period information as well as the defrosting information as described above.

A method for determining leakage of refrigerant used by the refrigerant leakage determining unit 85 will be described in further detail below with reference to a flowchart.

(4-6) Reference Value Calculating Unit

As described above, the storage unit 90 stores in advance the reference value used for the first value by the refrigerant leakage determining unit 85. In general, the reference value stored in advance in the storage unit 90 is not data obtained through an actual operation of the refrigeration cycle apparatus 1 for which leakage of the refrigerant is to be determined.

Accordingly, preferably, the reference value calculating unit 86 calculates a reference value based on the defrosting information of past stored in the storage unit 90, and updates the reference value already stored for the first value in the storage unit 90 with the newly calculated reference value. Such a configuration can suppress an influence of a difference in characteristics of the individual refrigeration cycle apparatuses 1, a difference in installed environments of the individual refrigeration cycle apparatuses 1, or the like on determination of leakage of the refrigerant.

For example, the reference value calculating unit 86 calculates the reference value based on the defrosting information of past stored in the storage unit 90 in a certain period from introduction of the refrigeration cycle apparatus 1, and updates the reference value already stored for the first value in the storage unit 90 with the newly calculated reference value. For example, the reference value calculating unit 86 calculates a reference value based on the defrosting information stored in the storage unit 90 in the first year from introduction of the refrigeration cycle apparatus 1 with a low probability of leakage of the refrigerant due to long-term deterioration, and updates the reference value already stored for the first value in the storage unit 90 with the newly calculated reference value. Note that a method used by the reference value calculating unit 86 to calculate the reference value for the first value is substantially the same as the method used by the refrigerant leakage determining unit 85 to calculate the first value except that the defrosting information used is the defrosting information stored in the storage unit 90 in the first year from the introduction.

As described above, the storage unit 90 stores in advance the first defrosting period t1 that is obtained when the refrigeration cycle apparatus 1 operates with an appropriate amount of refrigerant being charged in the refrigerant circuit 10 and that is used by the refrigerant leakage determining unit 85. In general, the reference value stored in advance in the storage unit 90 is not data obtained through an actual operation of the refrigeration cycle apparatus 1 for which leakage of the refrigerant is to be determined.

Accordingly, the reference value calculating unit 86 calculates the first defrosting period t1 based on the defrosting period information of past stored in the storage unit 90, and updates the first defrosting period t1 already stored in the storage unit 90 with the newly calculated first defrosting period t1. Such a configuration can suppress an influence of a difference in characteristics of the individual refrigeration cycle apparatuses 1, a difference in installed environments of the individual refrigeration cycle apparatuses 1, or the like on determination of leakage of the refrigerant.

For example, the reference value calculating unit 86 calculates the first defrosting period t1 based on the defrosting period information of past stored in the storage unit 90 in a certain period from introduction of the refrigeration cycle apparatus 1, and updates the first defrosting period t1 already stored in the storage unit 90 with the newly calculated first defrosting period t1. For example, the reference value calculating unit 86 calculates the first defrosting period t1 based on the defrosting period information stored in the storage unit 90 in the first year from introduction of the refrigeration cycle apparatus 1 with a low probability of leakage of the refrigerant due to long-term deterioration, and updates the first defrosting period t1 already stored in the storage unit 90 with the newly calculated first defrosting period t1.

(5) Refrigerant Leakage Determination Method

A refrigerant leakage determination method used by the refrigerant leakage determination system 100 will be described with reference to a flowchart of FIG. 3.

In the refrigerant leakage determination system 100, the defrosting information acquiring unit 82 acquires the defrosting information at a predetermining timing (step S1). The operation condition acquiring unit 84 acquires the operation condition at the predetermined timing (step S2). The defrosting period information acquiring unit 83 acquires the defrosting period information at the predetermined timing (step S3). Note that steps S1 to S3 need not be performed in this order. Steps S1 to S3 may be performed at different timings. For example, step S1 may be a step performed once an hour, and steps S2 and S3 may be steps performed once a day. The defrosting information, the operation condition, and the defrosting period information acquired in these steps are stored in the storage unit 90.

In step S4, it is determined whether a predetermined amount of information is stored in the storage unit 90. For example, it is determined in step S4 whether the defrosting information for one month, the operation condition for one month, and the defrosting period information for one month are stored in the storage unit 90 after processing of step S7 described later is performed last time. If it is determined in step S4 that the predetermined amount of information is stored in the storage unit 90, the process proceeds to step S5. If it is determined that the predetermined amount of information is not stored in the storage unit 90, the process returns to step S1.

In step S5, the refrigerant leakage determining unit 85 calculates the first value, based on the predetermined amount of defrosting information (for example, the defrosting information for one month) stored in the storage unit 90. Since calculation of the first value by the refrigerant leakage determining unit 85 has already been described, the detailed description is omitted herein. When calculating the first value, the refrigerant leakage determining unit 85 preferably calculates the first value, based on the defrosting information corrected in accordance with the operation condition stored in the storage unit 90.

In step S6, the refrigerant leakage determining unit 85 compares the first value calculated in step S5 with the reference value stored for the first value in the storage unit 90.

In step S7, the refrigerant leakage determining unit 85 determines leakage of the refrigerant, based on the comparison result of the calculated first value and the reference value.

For example, when the first value is a value obtained by dividing the total number of defrosting operations in a predetermined period by the total heating operation period in the predetermined period, the refrigerant leakage determining unit 85 determines that the refrigerant is leaking from the refrigerant circuit 10 (step S11) if the first value is greater than the reference value by a predetermined amount or more, and ends the refrigerant leakage determination process. After the end of the refrigerant leakage determination process, the process returns again to steps S1 to S3 to obtain the defrosting information, the operation condition, and the defrosting period information. Once the amounts of these information reach the predetermined amount, determination as to whether the refrigerant is leaking is made again.

The refrigerant leakage determination system 100 preferably includes an informing unit 9 electrically connected to the controller 8 (see FIG. 2). If it is determined in step S11 that the refrigerant is leaking, the informing unit 9 informs the result (leakage of the refrigerant) determined by the refrigerant leakage determining unit 85. The informing unit 9 is, for example, a warning lamp or a display. The informing unit 9 may also be a transmission unit that transmits a warning signal to a mobile terminal or the like of a user of the refrigeration cycle apparatus 1 or a worker who performs maintenance of the refrigeration cycle apparatus 1, or may be a speaker that emits warning sound.

Figure 11:
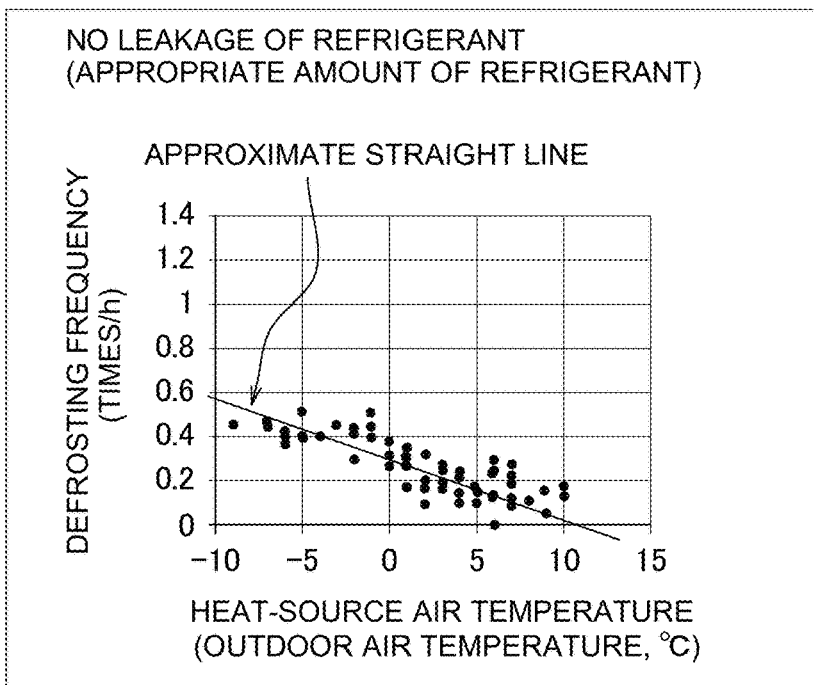
FIG. 11 is an example of a graph in which a temperature of heat-source air during a heating operation is assigned to a horizontal axis and a frequency of defrosting operations relative to a heating operation period under the heat-source air temperature condition is assigned to a vertical axis in the case where there is no leakage of refrigerant.
Figure 12:
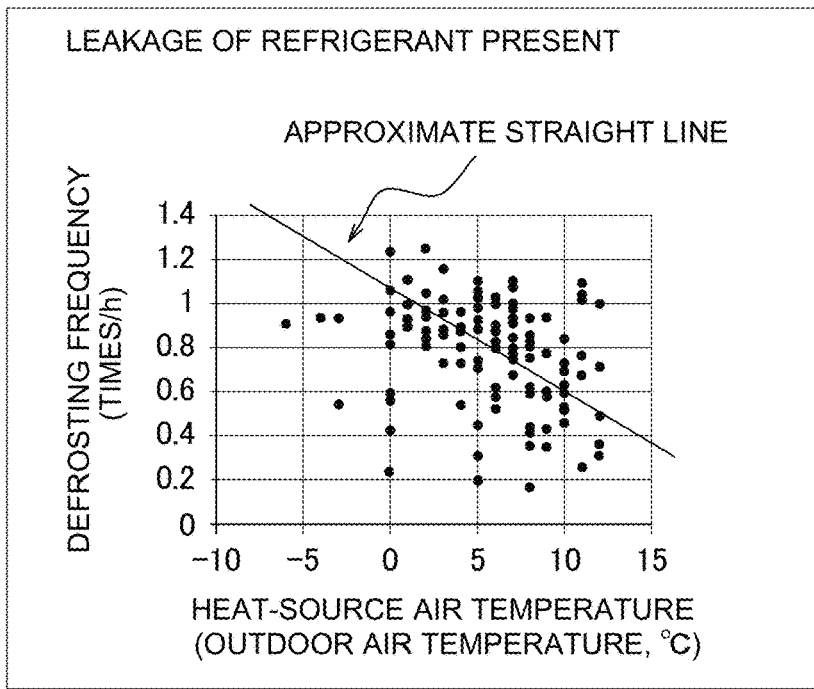
FIG. 12 is an example of a graph in which a temperature of heat-source air during a heating operation is assigned to a horizontal axis and a frequency of defrosting operations relative to a heating operation period under the heat-source air temperature condition is assigned to a vertical axis in the case where there is leakage of refrigerant.

For example, when the first value is values of a slope and an intercept of an approximate straight line obtained when plotting is performed in a graph with a horizontal axis assigned the temperature of the heat-source air during the heating operation and a vertical axis assigned the frequency of the defrosting operations relative to the heating operation period under the operation condition, the refrigerant leakage determining unit 85 determines that the refrigerant is leaking from the refrigerant circuit 10 if differences of these values from reference values illustrated in FIG. 11 are relatively large as illustrated in FIG. 12.

Figure 13:
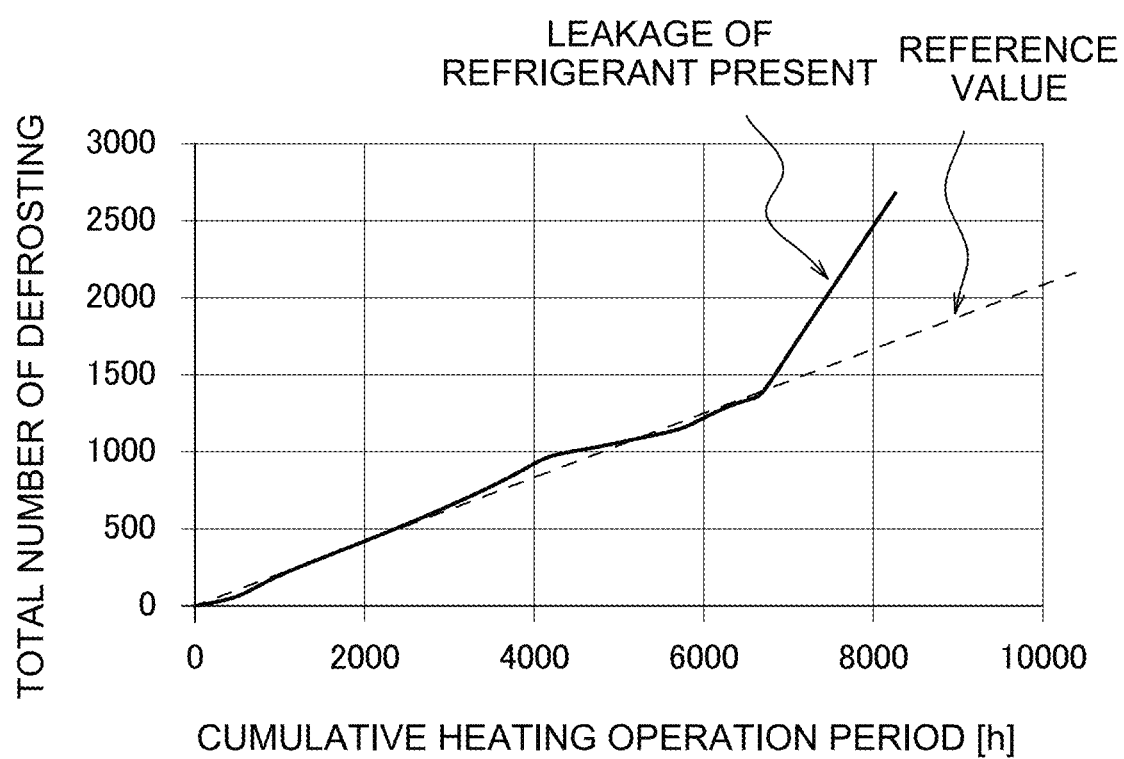
FIG. 13 is an example of a graph in which a cumulative heating operation period of the refrigeration cycle apparatus is assigned to a horizontal axis and the total number of defrosting is assigned to a vertical axis.

For example, when the first value is a slope of an approximate straight line obtained when a horizontal axis is assigned a cumulative heating operation period and a vertical axis is assigned the total number of defrosting operations, the refrigerant leakage determining unit 85 determines that the refrigerant is leaking form the refrigerant circuit 10 if the slope becomes greater than the reference value by a predetermined amount or more (see FIG. 13).

If it is determined in step S7 that there is no leakage of the refrigerant, the process proceeds to step S8.

In step S8, the refrigerant leakage determining unit 85 compares the defrosting period information acquired by the defrosting period information acquiring unit 83 and stored in the storage unit 90 with the first defrosting period t1 and the second defrosting period t2 described above.

In step S9, it is determined whether there is leakage of the refrigerant in the refrigerant circuit 10 of the refrigeration cycle apparatus 1, based on the comparison result obtained in step S8. If it is determined that the refrigerant is leaking, the process proceeds to step S11. On the other hand, if it is determined that the refrigerant is not leaking, the process proceeds to step S10, in which it is finally determined that there is no leakage of the refrigerant. The refrigerant leakage determination then ends. After the end of the refrigerant leakage determination process, the process returns again to steps S1 to S3 to obtain the defrosting information, the operation condition, and the defrosting period information. Once the amounts of these information reach the predetermined amount, determination as to whether the refrigerant is leaking is made again.

Figure 3:
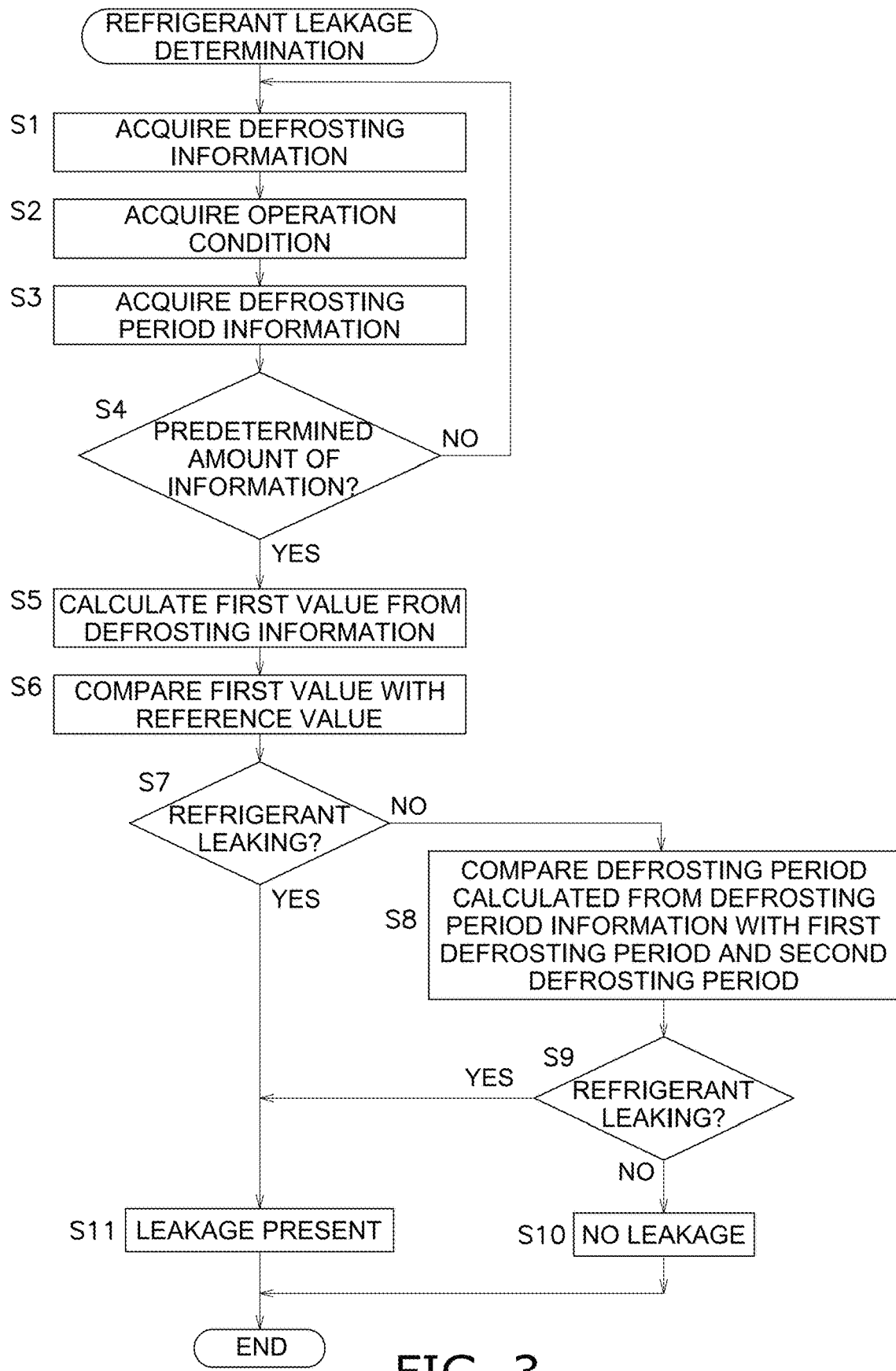
FIG. 3 is a flowchart of refrigerant leakage determination performed in the refrigeration cycle apparatus illustrated in FIG. 1.

Note that the flowchart illustrated in FIG. 3 is merely an example of the flowchart of the refrigerant leakage determination method. For example, in the flowchart illustrated in FIG. 3, the refrigerant leakage determining unit 85 determines whether there is leakage of the refrigerant on the basis of the defrosting period information if it is determined, based on the defrosting information, that the refrigerant is not leaking.

However, the configuration is not limited to this, and the refrigerant leakage determining unit 85 may determine whether there is leakage of the refrigerant on the basis of the defrosting period information if it is determined, based on the defrosting information, that the refrigerant is leaking. If it is determined that there is leakage of the refrigerant also based on the defrosting period information, that is, if it is determined that there is leakage of the refrigerant in the refrigerant leakage determination twice, it may be finally determined that there is leakage of the refrigerant.

The refrigerant leakage determining unit 85 may first determine whether there is leakage of the refrigerant based on the defrosting period information. If it is determined that there is not leakage of the refrigerant, the refrigerant leakage determining unit 85 may determine whether there is leakage of the refrigerant based on the defrosting information. Alternatively, the refrigerant leakage determining unit 85 may first determine whether there is leakage of the refrigerant based on the defrosting period information. If it is determined that there is leakage of the refrigerant, the refrigerant leakage determining unit 85 may further determine whether there is leakage of the refrigerant based on the defrosting information. If it is determined that there is leakage of the refrigerant also based on the defrosting information, the refrigerant leakage determining unit 85 may finally determine that there is leakage of the refrigerant.

(6) Features (6-1)

The refrigerant leakage determination system 100 according to the present embodiment is the refrigerant leakage determination system 100 of the refrigeration cycle apparatus 1. The refrigeration cycle apparatus 1 includes the refrigerant circuit 10 including the compressor 21 and the heat-source-side heat exchanger 23 serving as an example of a first heat exchanger. The refrigeration cycle apparatus 1 has, as the operating modes, at least a heating mode which is an example of a normal mode and a defrosting mode. The heating mode is an operating mode in which the heat-source-side heat exchanger 23 is caused to function as an evaporator. The defrosting mode is an operating mode in which the heat-source-side heat exchanger 23 frosted during an operation in the heating mode is defrosted. The refrigerant leakage determination system 100 includes the defrosting information acquiring unit 82, the storage unit 90, and the refrigerant leakage determining unit 85. The defrosting information acquiring unit 82 acquires defrosting information. The defrosting information is information regarding a relationship between a heating operation period for which the refrigeration cycle apparatus 1 operates in the heating mode and the number of defrosting operations in which the refrigeration cycle apparatus 1 operates in the defrosting mode. The heating operation period is an example of a normal operation period. The storage unit 90 stores the defrosting information acquired by the defrosting information acquiring unit 82. The refrigerant leakage determining unit 85 determines, based on the defrosting information, leakage of refrigerant in the refrigerant circuit 10 of the refrigeration cycle apparatus 1.

The refrigerant leakage determination system 100 can detect leakage of the refrigerant without requiring complicated processing for acquiring special information such as a capacity of a heat exchanger.

The refrigerant leakage determination system 100 determines leakage of the refrigerant in the refrigerant circuit, based on the frequency of the defrosting operations which the refrigeration cycle apparatus 1 performs in order to demonstrate the function thereof. Therefore, the refrigeration cycle apparatus 1 need not perform a special operation for determining leakage of the refrigerant such as an amount-of-refrigerant determination operation, and thus can determine the occurrence of leakage of the refrigerant while suppressing an increase in a period for which the heating operation is interrupted.

(6-2)

The refrigerant leakage determination system 100 according to the present embodiment includes the operation condition acquiring unit 84 that acquires an operation condition. The operation condition includes at least one of a temperature of air that exchanges heat in the heat-source-side heat exchanger 23 when the refrigeration cycle apparatus 1 is in operation in the heating mode, a humidity of the air that exchanges heat in the heat-source-side heat exchanger 23 when the refrigeration cycle apparatus 1 is in operation in the heating mode, and the number of rotations of the compressor 21 when the refrigeration cycle apparatus 1 is in operation in the heating mode. Particularly in the present embodiment, the operation condition includes the temperature and humidity of the air that exchanges heat in the heat-source-side heat exchanger 23 and the number of rotations of the compressor 21 when the refrigeration cycle apparatus 1 is in operation in the heating mode. The refrigerant leakage determining unit 85 determines, based further on the operation condition, leakage of the refrigerant in the refrigerant circuit 10 of the refrigeration cycle apparatus 1.

The refrigerant leakage determination system 100 according to the present embodiment determines leakage of the refrigerant, based on the frequency of the defrosting operations in consideration of the temperature or humidity of the air that exchanges heat in the heat-source-side heat exchanger 23 or the number of rotations of the compressor 21 during the heating operation, which may influence the frequency of the defrosting operations. Therefore, this refrigerant leakage determination system 100 can accurately determine the occurrence of leakage of the refrigerant.

(6-3)

In the refrigerant leakage determination system 100 according to the present embodiment, the refrigerant leakage determining unit 85 calculates, as the first value, based on the defrosting information, a value serving as an index of a frequency of the defrosting operations relative to a normal operation period or a value serving as an index of a change in the frequency of the defrosting operations relative to the normal operation period. The refrigerant leakage determining unit 85 determines leakage of the refrigerant in the refrigerant circuit 10 of the refrigeration cycle apparatus 1, based on a result of comparing the first value with a reference value.

Such a configuration enables the refrigerant leakage determination system 100 to accurately determine leakage of the refrigerant.

(6-4)

The refrigerant leakage determination system 100 according to the present embodiment includes the reference value calculating unit 86. The reference value calculating unit 86 calculates the reference value, based on the defrosting information of past stored in the storage unit 90.

Since the reference value used for determining whether there is leakage of the refrigerant is calculated from the defrosting information of the refrigeration cycle apparatus 1 itself, an influence of a difference in characteristics of individual apparatuses, a difference in installed environments of the apparatuses, or the like on determination of leakage of the refrigerant can be suppressed.

(6-5)

In the refrigerant leakage determination system 100 according to the present embodiment, the reference value calculating unit 86 calculates the reference value, based on the defrosting information of past stored in the storage unit 90 in a predetermined period from introduction of the refrigeration cycle apparatus 1. For example, the reference value calculating unit 86 calculates the reference value, based on the defrosting information of past stored in the storage unit 90 in the first year from introduction of the refrigeration cycle apparatus 1.

In the refrigerant leakage determination system 100 according to the present embodiment, since the reference value is calculated based on the defrosting information for a predetermined period from introduction of the refrigeration cycle apparatus 1 with a low probability of leakage of the refrigerant due to long-term deterioration, it is particularly easy to calculate an appropriate reference value.

(6-6)

The refrigerant leakage determination system 100 according to the above embodiment includes the defrosting period information acquiring unit 83. The defrosting period information acquiring unit 83 acquires defrosting period information regarding a period of each defrosting operation in which the refrigeration cycle apparatus 1 operates in the defrosting mode. The refrigerant leakage determining unit 85 determines, based further on the defrosting period information, leakage of the refrigerant in the refrigerant circuit 10 of the refrigeration cycle apparatus 1.

Since leakage of the refrigerant is determined based on the defrosting period information in addition to the defrosting information, the refrigerant leakage determination system 100 can accurately determine leakage of the refrigerant.

Second Embodiment

Figure 4:
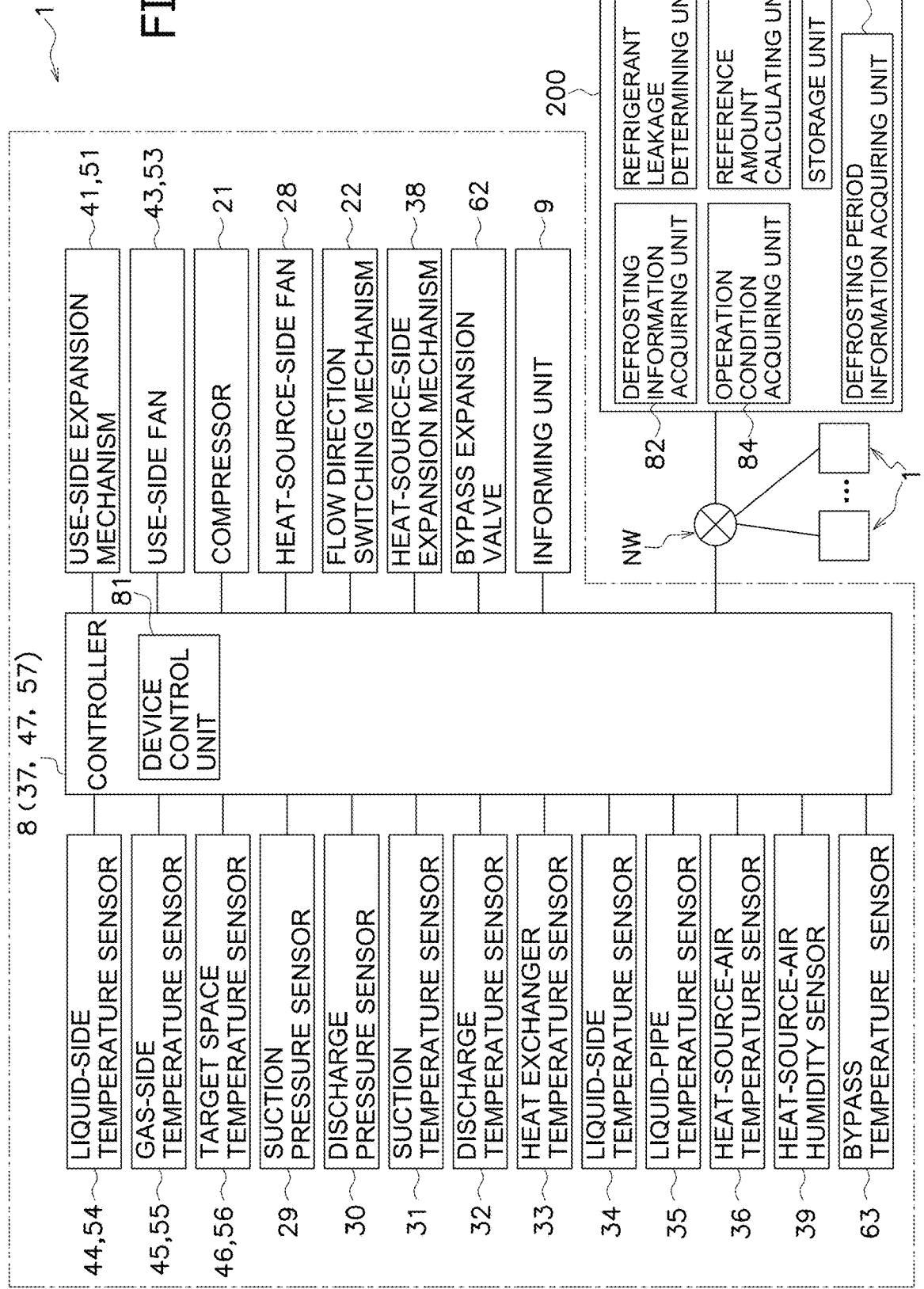
FIG. 4 is a block diagram of a refrigeration cycle apparatus and a refrigerant leakage determination system according to a second embodiment that determines leakage of refrigerant in a refrigerant circuit of the refrigeration cycle apparatus.

A refrigerant leakage determination system 100A according to a second embodiment will be described with reference to the drawings. FIG. 4 is a block diagram of the refrigeration cycle apparatus 1 and the refrigerant leakage determination system 100A.

In the second embodiment, the controller 8 of the refrigeration cycle apparatus 1 does not include the refrigerant leakage determination system 100. In the second embodiment, a server 200 connected to the controller 8 via a network NW such as the Internet functions as the refrigerant leakage determination system 100A. The refrigerant leakage determination system 100 according to the first embodiment determines leakage of the refrigerant for the refrigeration cycle apparatus 1 equipped with the refrigerant leakage determination system 100. In contrast, the refrigerant leakage determination system 100A determines leakage of the refrigerant for the plurality of refrigeration cycle apparatuses 1.

The refrigeration cycle apparatus 1 is substantially the same as that of the first embodiment except that the controller 8 does not include the refrigerant leakage determination system 100 and that the controller 8 is connected to the server 200 via the network NW so as to be able to perform communication. Thus, description is omitted herein.

The refrigerant leakage determination system 100A is generally the same as the refrigerant leakage determination system 100 according to the first embodiment except for part of processing performed by a refrigerant leakage determining unit 85A and a reference value calculating unit 86A. Accordingly, description of the refrigerant leakage determination system 100A is basically omitted except for these differences.

The server 200 is a computer connected to the controller 8 of the refrigeration cycle apparatus 1 via the network NW so as to be able to perform communication. The server 200 is connected only to the controller 8 in FIG. 4. However, the connection is not limited to such a configuration, and the server 200 may be directly connected to some or all of the various sensors 29 to 36, 39, 44 to 46, 54 to 56, and 63 via the network NW. The server 200 may directly acquire various measured values from some or all of the various sensors 29 to 36, 39, 44 to 46, 54 to 56, and 63 instead of acquiring the various measured values from some or all of the various sensors 29 to 36, 39, 44 to 46, 54 to 56, and 63 via the controller 8. The server 200 mainly includes a CPU, a RAM, a ROM, and an external storage device such as a hard disk. As a result of the CPU executing various programs stored in the ROM or the external storage device, the server 200 functions as the refrigerant leakage determination system 100A.

The refrigerant leakage determination system 100A acquires defrosting information, defrosting period information, and operation information from the plurality of refrigeration cycle apparatuses 1 and stores the defrosting information, the defrosting period information, and the operation information in the storage unit 90. The storage unit 90 stores the defrosting information, the defrosting period information, and the operation information such that the refrigeration cycle apparatus 1 that has transmitted the information is distinguishable.

In the refrigerant leakage determination system 100 according to the first embodiment, the storage unit 90 stores in advance the initial reference value for the first value, the first defrosting period t1, and the second defrosting period t2. The refrigerant leakage determining unit 85A of the refrigerant leakage determination system 100A uses the initial reference value for the first value, the first defrosting period t1, and the second defrosting period t2 that are stored in advance, to determine leakage of the refrigerant at the start of the use of the refrigerant leakage determination system 100A. However, once the defrosting information and the defrosting period information of the plurality of refrigeration cycle apparatuses 1 are stored in the storage unit 90, the reference value calculating unit 86A of the refrigerant leakage determination system 100A preferably calculates the reference value for the first value based on the defrosting information of past of the plurality of refrigeration cycle apparatuses 1 stored in the storage unit 90. The reference value calculating unit 86A preferably calculates the first defrosting period t1, based on the defrosting period information of past of the plurality of refrigeration cycle apparatuses 1 stored in the storage unit 90. The reference value for the first value and the first defrosting period t1 stored in the storage unit 90 are updated to the values calculated by the reference value calculating unit 86A.

Since the reference value calculating unit 86A calculates the reference value based on the actual defrosting information of the refrigeration cycle apparatus 1, particularly, based on many pieces of defrosting information obtained from the plurality of refrigeration cycle apparatuses 1 instead of a single refrigeration cycle apparatus 1, an appropriate reference value tends to be obtained in the refrigerant leakage determination system 100A. Since the reference value calculating unit 86A calculates the first defrosting period t1, based on the actual defrosting period information of the refrigeration cycle apparatus 1, particularly, based on many pieces of defrosting period information obtained from the plurality of refrigeration cycle apparatuses 1 instead of a single refrigeration cycle apparatus 1, an appropriate reference value tends to be obtained in the refrigerant leakage determination system 100A. In the case where the refrigeration cycle apparatus 1 subjected to refrigerant leakage determination is added, even if there are not sufficient amounts of defrosting information and defrosting period information of that refrigeration cycle apparatus 1 or there are no defrosting information and defrosting period information of that refrigeration cycle apparatus 1, leakage of the refrigerant can be determined using a relatively appropriate reference value in the refrigerant leakage determination system 100A.

Figure 5:
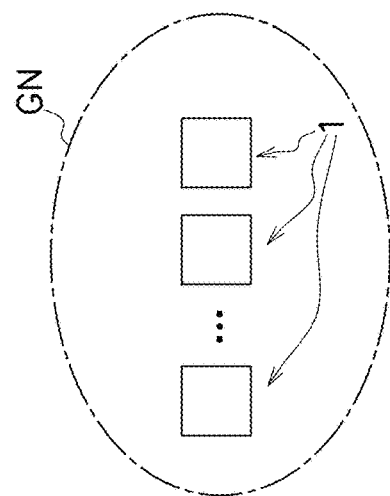
FIG. 5 is a diagram for describing a plurality of refrigeration cycle apparatus groups.
Figure 5:
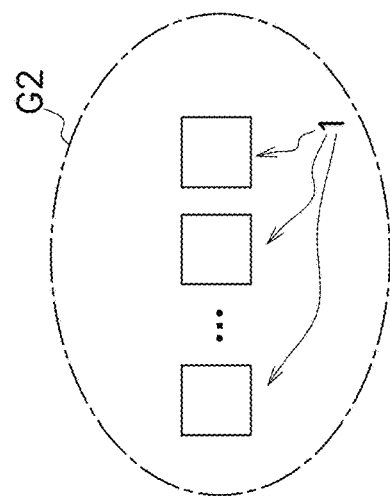
Figure 5:
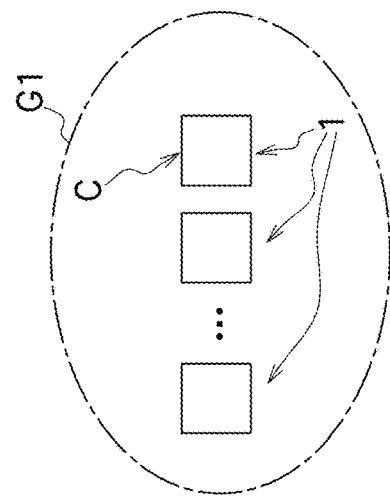

Preferably, for each of refrigeration cycle apparatus groups G1, G2, . . . GN, the reference value calculating unit 86A calculates a reference value based on defrosting information of past stored in the storage unit 90 for the plurality of refrigeration cycle apparatuses 1 included in a corresponding refrigeration cycle apparatus group of the refrigeration cycle apparatus groups G1, G2, . . . GN (see FIG. 5). Each of the refrigeration cycle apparatus groups G1, G2, . . . GN is constituted by the plurality of refrigeration cycle apparatuses 1 having similar conditions of the temperature and humidity of air that exchanges heat in the heat-source-side heat exchanger 23. For example, each of the refrigeration cycle apparatus groups G1, G2, . . . GN is constituted by the plurality of refrigeration cycle apparatuses 1 installed at the same site or in the same region where there are almost no difference in weather conditions. However, the plurality of refrigeration cycle apparatuses 1 constituting each of the refrigeration cycle apparatus groups G1, G2, . . . GN are not limited to the refrigeration cycle apparatuses 1 installed at the same site or in the same region.

The refrigerant leakage determining unit 85A preferably performs determination in the following manner when determining leakage of the refrigerant in the refrigerant circuit 10 of a first refrigeration cycle apparatus C which is one of the plurality of refrigeration cycle apparatuses 1. The refrigerant leakage determining unit 85A calculates the first value, based on defrosting information of the first refrigeration cycle apparatus C. The refrigerant leakage determining unit 85A then determines leakage of the refrigerant in the refrigerant circuit 10 of the first refrigeration cycle apparatus C, based on a result of comparing the calculated first value with the reference value calculated by the reference value calculating unit 86A for the refrigeration cycle apparatus group G1 (see FIG. 5). The refrigeration cycle apparatus group G1 is a group of the refrigeration cycle apparatuses that are similar to the first refrigeration cycle apparatus C in terms of the temperature and humidity of air that exchanges heat in the heat-source-side heat exchanger 23.

Although description is omitted, the same applies to the case where the refrigerant leakage determining unit 85A determines leakage of the refrigerant based on the defrosting period information.

In the refrigerant leakage determination system 100A, since the reference value is calculated based on the defrosting information obtained from the plurality of refrigeration cycle apparatuses 1 having similar temperature and humidity conditions at the installed places, an appropriate reference value tends to be obtained. In addition, in the refrigerant leakage determination system 100A, since the reference value is calculated based on the defrosting period information obtained from the plurality of refrigeration cycle apparatuses 1 having similar temperature and humidity conditions at the installed places, an appropriate reference value tends to be obtained.

Third Embodiment

Figure 6:
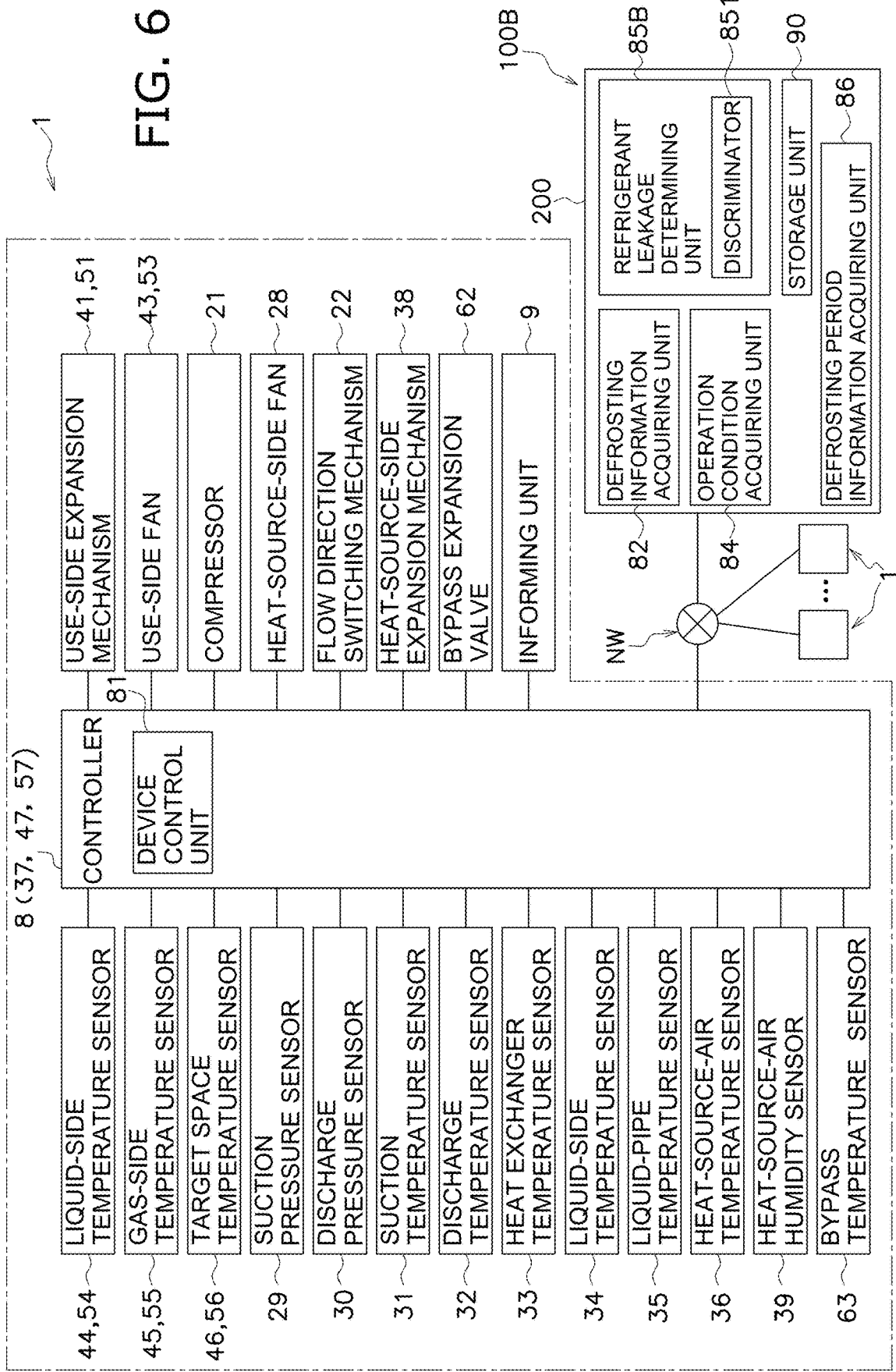
FIG. 6 is a block diagram of a refrigeration cycle apparatus and a refrigerant leakage determination system according to a third embodiment that determines leakage of refrigerant in a refrigerant circuit of the refrigeration cycle apparatus.

A refrigerant leakage determination system 100B according to a third embodiment will be described with reference to the drawings. FIG. 6 is a block diagram of the refrigeration cycle apparatus 1 and the refrigerant leakage determination system 100B.

In the third embodiment, as in the second embodiment, the server 200 connected to the controller 8 of the refrigeration cycle apparatus 1 via the network NW such as the Internet functions as the refrigerant leakage determination system 100B. As in the second embodiment, the refrigerant leakage determination system 100B determines leakage of the refrigerant for the plurality of refrigeration cycle apparatuses 1.

Processing performed by a refrigerant leakage determining unit 85B of the refrigerant leakage determination system 100B according to the third embodiment differs from the processing performed by the refrigerant leakage determining unit 85A of the refrigerant leakage determination system 100A according to the second embodiment. The refrigerant leakage determination system 100B according to the third embodiment does not include the reference value calculating unit 86A, and the reference value for the first value, the first defrosting period t1, and the second defrosting period t2 are not stored in the storage unit 90. Matters relating to these differences between the refrigerant leakage determination system 100B and the refrigerant leakage determination system 100A will be mainly described herein, and description of common points is omitted.

Figure 7:
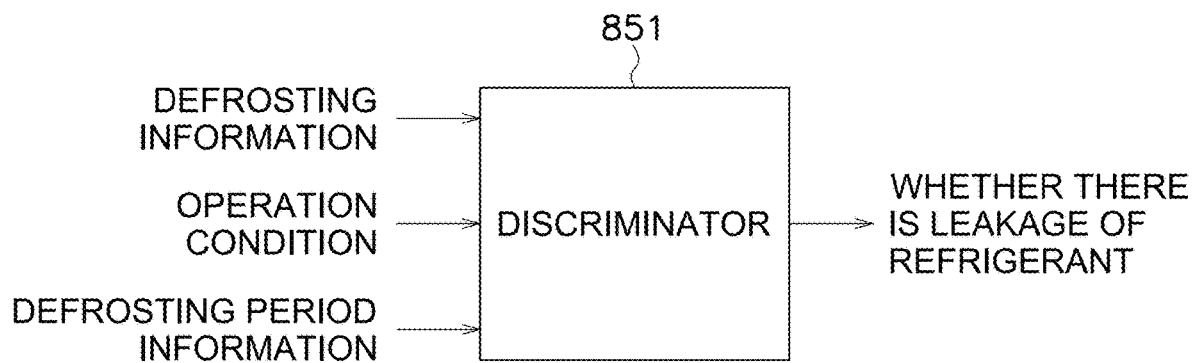
FIG. 7 is a diagram schematically illustrating a procedure of the refrigerant leakage determination performed by the refrigerant leakage determination system illustrated in FIG. 6.

As a major difference from the refrigerant leakage determining unit 85A of the refrigerant leakage determination system 100A, the refrigerant leakage determining unit 85B includes a discriminator 851 (see FIG. 6) that has learned a relationship between whether there is leakage of refrigerant in the refrigerant circuit 10 and the defrosting information, defrosting period information, and operation condition. The refrigerant leakage determining unit 85B determines leakage of the refrigerant in the refrigerant circuit 10 by inputting the defrosting information, the defrosting period information, the operation condition, and the like to the discriminator 851 (see FIG. 7).

The discriminator 851 learns so that the discriminator 851 outputs whether there is leakage of the refrigerant in the refrigerant circuit 10 in response to an input including the defrosting information, the defrosting period information, and information regarding the operation condition. The refrigerant leakage determining unit 85B determines whether there is leakage of the refrigerant in the refrigerant circuit 10 by inputting an input including the defrosting information, the defrosting period information, and information regarding the operation condition to the discriminator 851. Note that information other than the above information may be further used as the input.

In the present embodiment, the discriminator 851 has been trained through machine learning. Machine learning refers to a technique or method that enables a computer to perform learning based on supplied information instead of rules (even if rules or the like for determination are not given in advance) and autonomously discover rules for determination.

The discriminator 851 has been trained through supervised learning, for example. Supervised learning refers to a machine learning technique that causes the discriminator 851 to perform learning by providing many pieces of data (training data) in which an input and a correct output for the input are associated with each other.

The input in the training data includes the defrosting information, the operation condition, and the defrosting period information.

The correct output in the training data is, for example, whether the amount of refrigerant is an appropriate amount of refrigerant or an refrigerant is leaking (the amount of refrigerant has decreased from the appropriate amount of refrigerant). Note that the refrigerant leakage determining unit 85B may determine a decrease in the amount of refrigerant in steps in addition to determining whether the refrigerant is leaking. In this case, the correct output in the training data may be, for example, a value such as a percentage (%) of the amount of refrigerant relative to the appropriate amount of refrigerant.

As the training data, values of the defrosting information, the defrosting period information, and the operation condition obtained by actually causing a test machine of the refrigeration cycle apparatus 1 to operate by changing the amount of refrigerant (for the case of the appropriate amount of refrigerant and the case where the amount of refrigerant is less than the appropriate amount of refrigerant) are used. In the case where the server 200 is connected to the plurality of refrigeration cycle apparatuses 1 via the network NW, the training data may be data obtained through actual operations of the plurality of refrigeration cycle apparatuses 1 for which the amount of refrigerant is known (whether there is leakage of the refrigerant is known).

A learning algorithm used by the discriminator 851 is, for example, a neural network. As the learning algorithm, any other known machine learning algorithm (such as the support vector machine or linear discriminant analysis, for example) may be used. The learning algorithm may be an algorithm in which a machine automatically extracts feature quantities as in deep learning. The learning algorithm may be a machine learning algorithm in which a person extracts feature quantities. When the defrosting information, the defrosting period information, and the operation condition in the storage unit 90 are stored, the refrigerant leakage determining unit 85B inputs these values into the trained discriminator 851 and determines whether there is leakage of the refrigerant by using the trained discriminator 851.

The refrigerant leakage determination system 100B can accurately determine an amount of refrigerant by using the discriminator 851 that has learned a relationship between information regarding the reverse cycle operation and the amount of refrigerant in the refrigerant circuit 10.

The case where the server 200 functions as the refrigerant leakage determination system 100B is described herein. However, instead of this, the controller 8 of the refrigeration cycle apparatus 1 may function as the refrigerant leakage determination system 100B and may include the refrigerant leakage determining unit 85B including the discriminator 851 (not illustrated). At this time, the refrigerant leakage determining unit 85B of the refrigeration cycle apparatus 1 may determine leakage of the refrigerant in the refrigeration cycle apparatus 1 that includes the refrigerant leakage determination system 100B, instead of leakage of refrigerant in the plurality of refrigeration cycle apparatuses 1.

Figure 8:
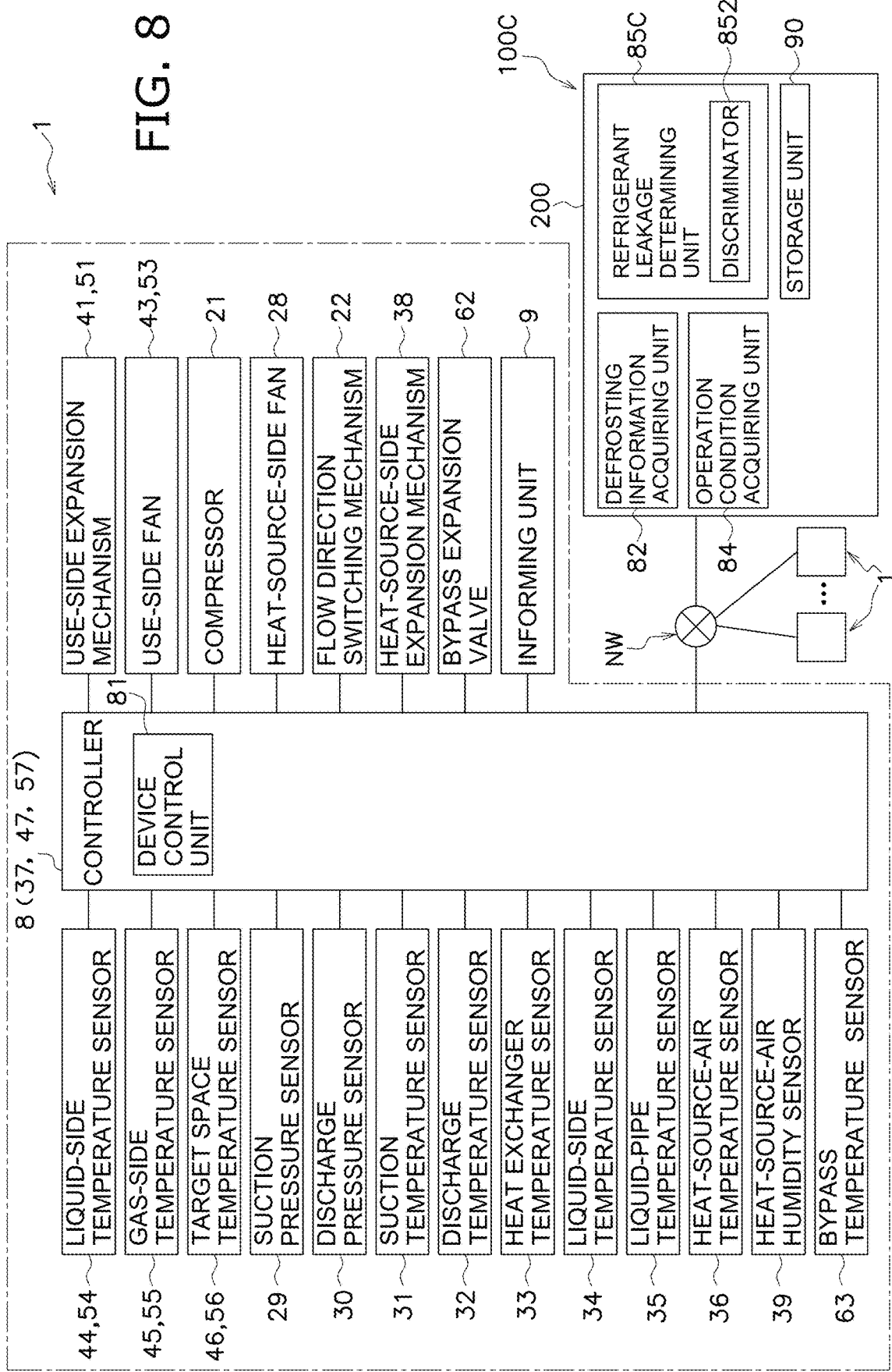
FIG. 8 is a block diagram of a refrigeration cycle apparatus and a refrigerant leakage determination system according to another embodiment that determines leakage of refrigerant in a refrigerant circuit of the refrigeration cycle apparatus.
Figure 9:
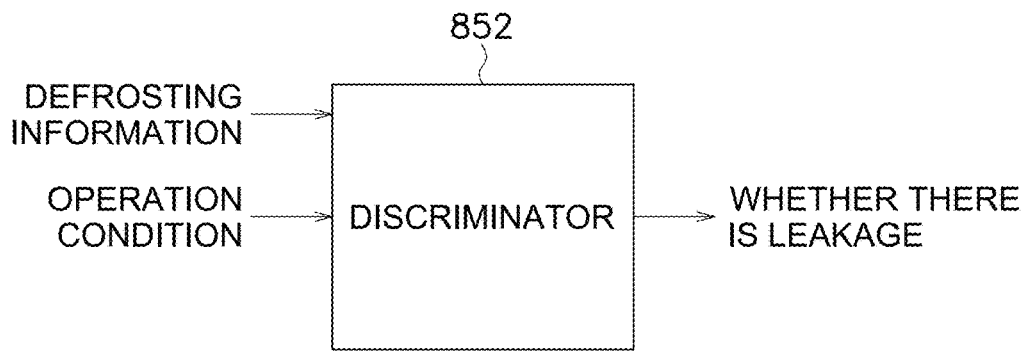
FIG. 9 is a diagram schematically illustrating a procedure of the refrigerant leakage determination performed by the refrigerant leakage determination system illustrated in FIG. 8.

In the embodiment, the refrigerant leakage determining unit 85B includes the discriminator 851 that has learned a relationship between whether there is leakage of the refrigerant in the refrigerant circuit 10 and the defrosting information, defrosting operation period information, and operation condition. However, the configuration is not limited to this, and the refrigerant leakage determination system may include a discriminator 852 that has learned a relationship between whether there is leakage of the refrigerant in the refrigerant circuit 10 and the defrosting information and operation condition, just like a refrigerant leakage determination system 100C illustrated in FIG. 8. A refrigerant leakage determining unit 85C of the refrigerant leakage determination system 100C determines leakage of the refrigerant in the refrigerant circuit 10 by inputting the defrosting information acquired by the defrosting information acquiring unit 82 and the operation condition acquired by the operation condition acquiring unit 84 to the discriminator 852 (see FIG. 9). Since the discriminator 852 is substantially the same as the discriminator 851 except for an input to be used, detailed description thereof is omitted.

Fourth Embodiment

Figure 14:
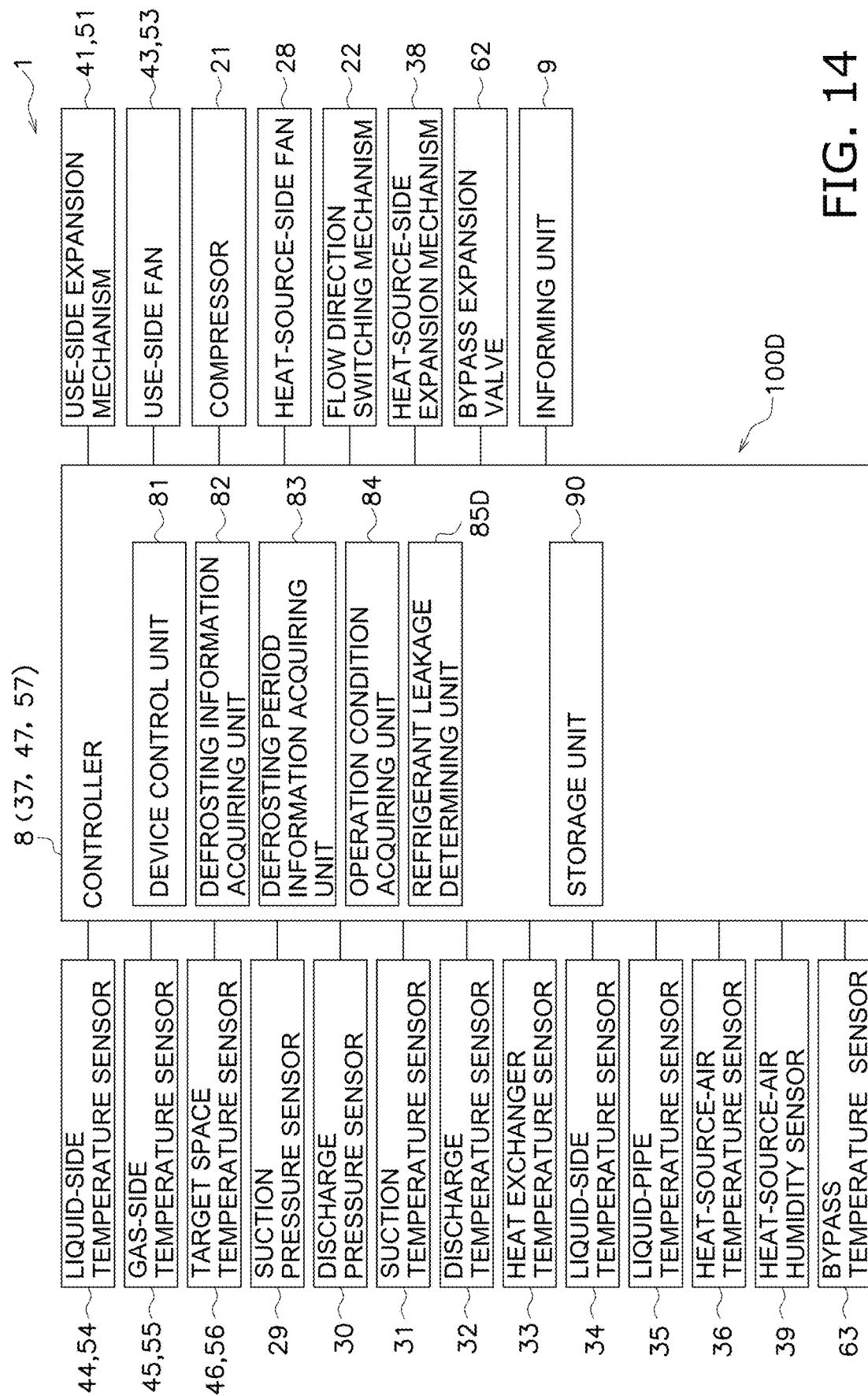
FIG. 14 is a schematic configuration diagram of a refrigeration cycle apparatus including a refrigerant leakage determination system according to a fourth embodiment.
Figure 15:
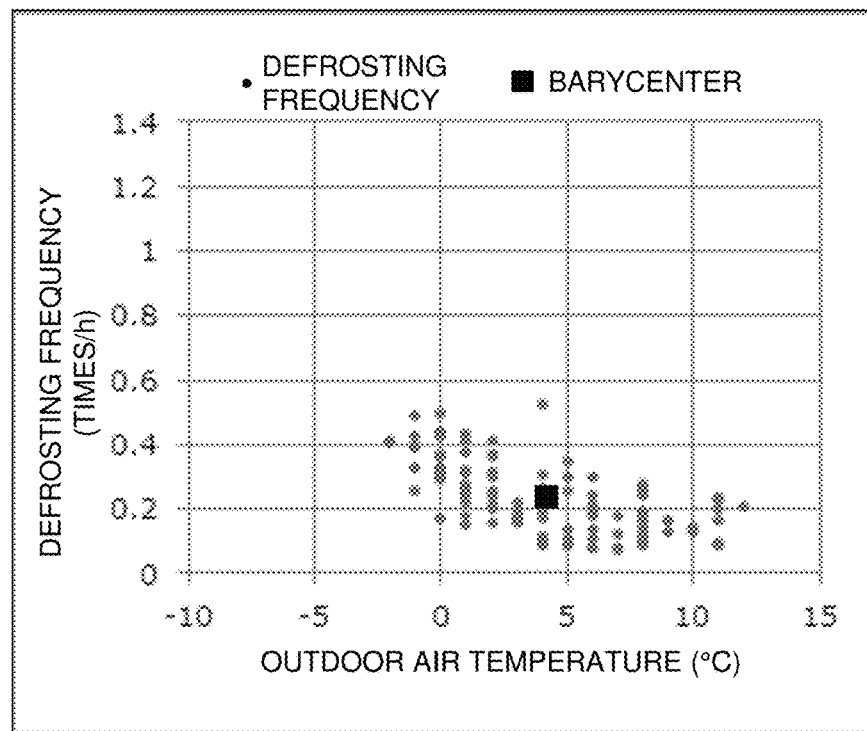
FIG. 15 is an example of a graph in which data obtained through an actual operation of the refrigeration cycle apparatus is plotted in coordinates with a horizontal axis assigned an outdoor air temperature and a vertical axis assigned a defrosting frequency.
Figure 16:
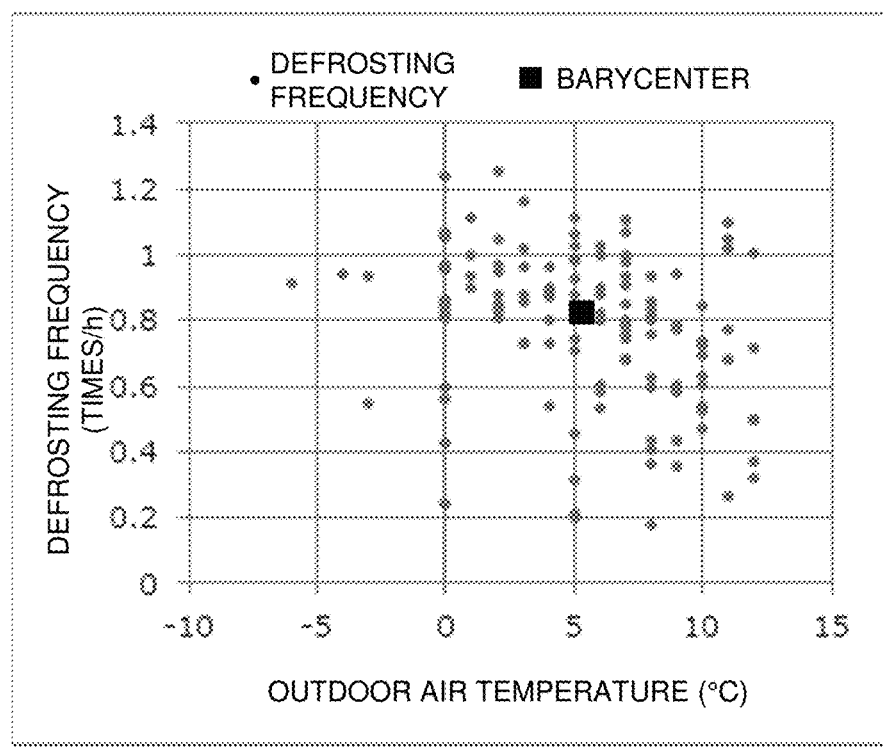
FIG. 16 is another example of a graph in which data obtained through an actual operation of the refrigeration cycle apparatus is plotted in coordinates with a horizontal axis assigned an outdoor air temperature and a vertical axis assigned a defrosting frequency.
Figure 17:
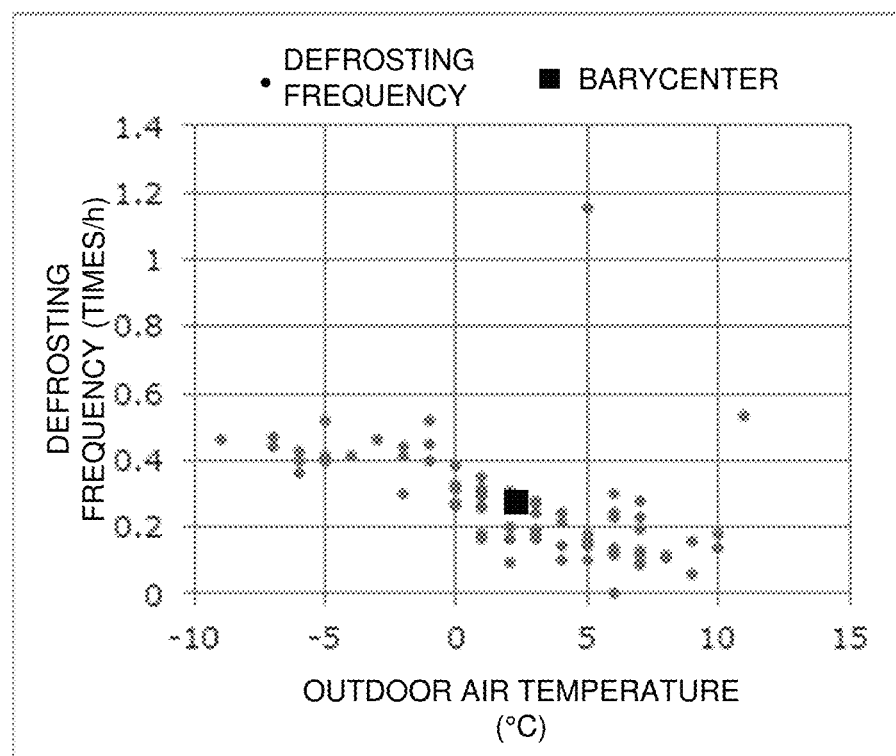
FIG. 17 is an example of a graph in which comparative data is plotted in coordinates with a horizontal axis assigned an outdoor air temperature and a vertical axis assigned a defrosting frequency.
Figure 18:
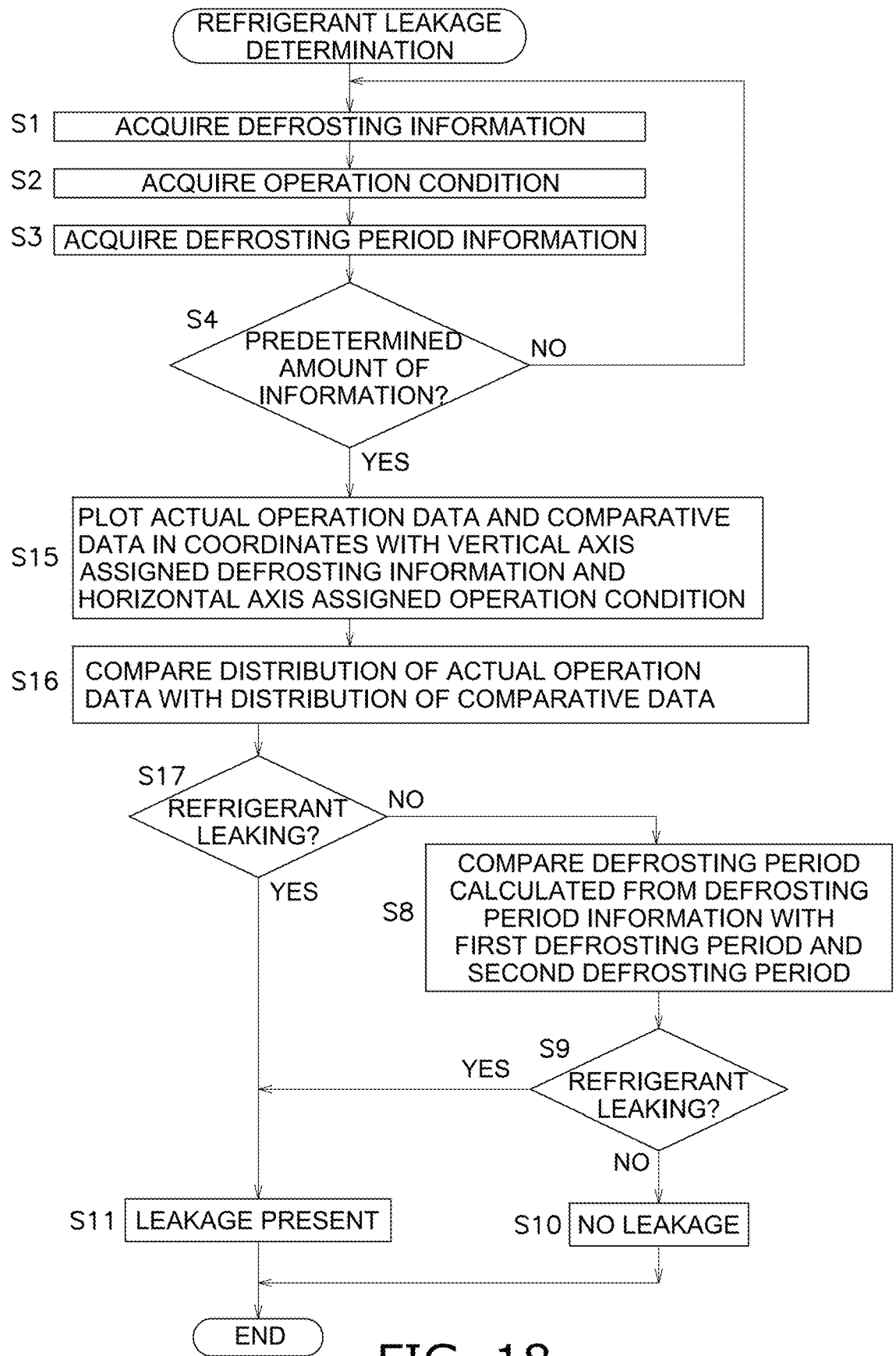
FIG. 18 is a flowchart of refrigerant leakage determination performed in the refrigeration cycle apparatus illustrated in FIG. 14.
Figure 19:
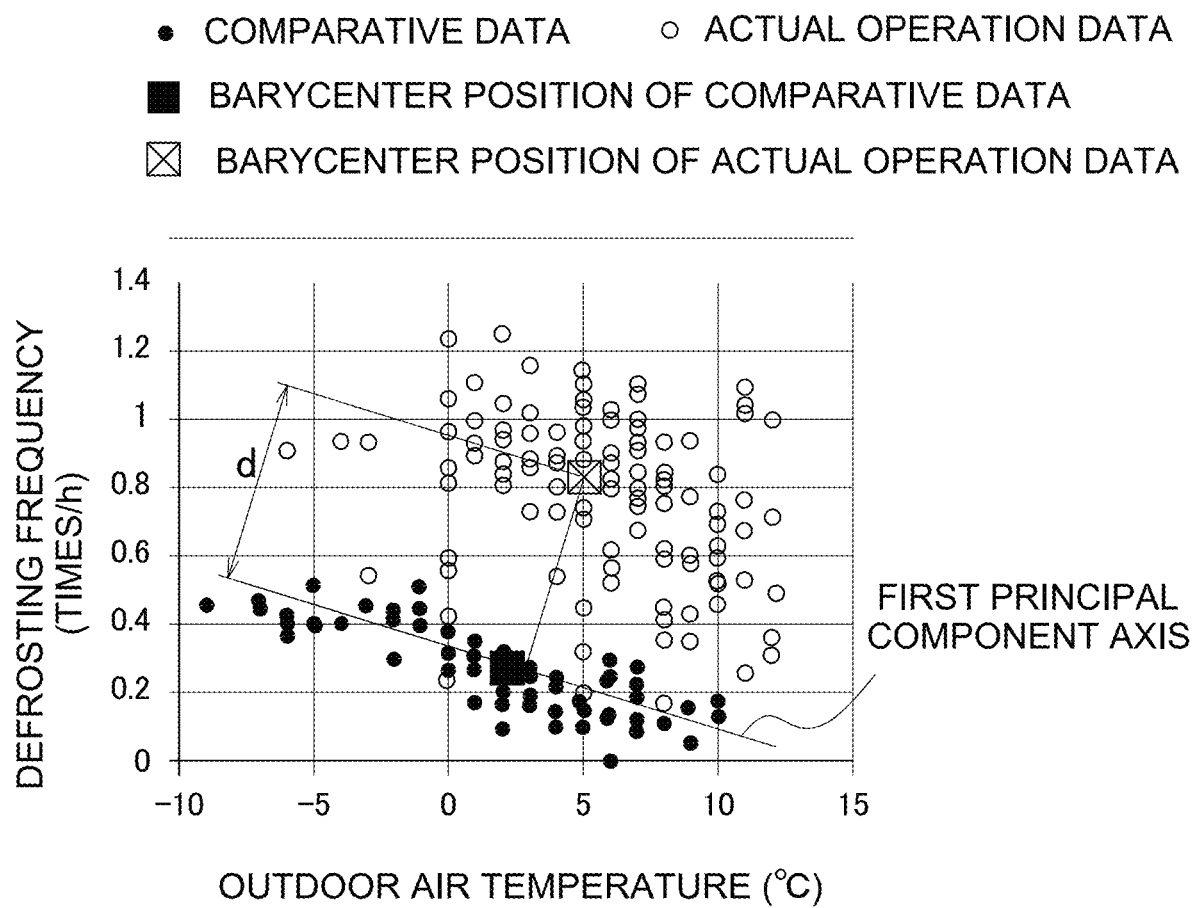
FIG. 19 is an example of a graph in which the data obtained through the actual operation of the refrigeration cycle apparatus in FIG. 16 and the comparative data in FIG. 17 are plotted in coordinates with a horizontal axis assigned an outdoor air temperature and a vertical axis assigned a defrosting frequency.

Another embodiment of a refrigerant leakage determination method used by the refrigerant leakage determination system will be described with reference to FIGS. 14 to 19. FIG. 14 is a block diagram of the refrigeration cycle apparatus 1 including a refrigerant leakage determination system 100D according to a fourth embodiment. FIG. 15 is an example of a graph in which data obtained through an actual operation of the refrigeration cycle apparatus 1 is plotted in coordinates with a horizontal axis assigned an outdoor air temperature and a vertical axis assigned a defrosting frequency. FIG. 16 is another example of a graph in which data obtained through an actual operation of the refrigeration cycle apparatus 1 is plotted in coordinates with a horizontal axis assigned an outdoor air temperature and a vertical axis assigned a defrosting frequency. FIG. 17 is an example of a graph in which comparative data described below is plotted in coordinates with a horizontal axis assigned an outdoor air temperature and a vertical axis assigned a defrosting frequency. FIG. 18 is an example of a flowchart of refrigerant leakage determination performed in the refrigeration cycle apparatus 1. FIG. 19 is an example of a graph in which the data obtained through the actual operation of the refrigeration cycle apparatus 1 in FIG. 16 and the comparative data in FIG. 17 are plotted in coordinates with a horizontal axis assigned an outdoor air temperature and a vertical axis assigned a defrosting frequency.

The refrigeration cycle apparatus 1 is substantially the same as the refrigeration cycle apparatus 1 described in the first embodiment in portions other than the refrigerant leakage determination system 100D. Thus, description of the portions other than the refrigerant leakage determination system 100D will be omitted herein.

The refrigerant leakage determination system 100D determines leakage of refrigerant for the refrigeration cycle apparatus 1 equipped with the refrigerant leakage determination system 100D, just like the refrigerant leakage determination system 100 according to the first embodiment. The target of the refrigerant leakage determination is not limited to this, and the refrigerant leakage determination system 100D may determine leakage of refrigerant for the plurality of refrigeration cycle apparatuses 1 by using a method similar to the refrigerant leakage determination method described herein, just like the refrigerant leakage determination system 100A according to the second embodiment.

The refrigerant leakage determination system 100D includes, as functional units, the defrosting information acquiring unit 82, the defrosting period information acquiring unit 83, the operation condition acquiring unit 84, a refrigerant leakage determining unit 85D, and the storage unit 90. The refrigerant leakage determination system 100D is generally the same as the refrigerant leakage determination system 100 according to the first embodiment except that the refrigerant leakage determination system 100D does not include the reference value calculating unit 86 and that processing performed by the refrigerant leakage determining unit 85D differs from the processing performed by the refrigerant leakage determining unit 85 of the refrigerant leakage determination system 100. Herein, differences of the refrigerant leakage determination system 100D from the refrigerant leakage determination system 100 will be mainly described, and description regarding the similar points will be omitted unless otherwise necessary.

The refrigerant leakage determining unit 85D determines leakage of refrigerant in the refrigerant circuit 10 of the refrigeration cycle apparatus 1, based on defrosting information and an operation condition in the following manner.

It is assumed in the present embodiment that the storage unit 90 stores each of pieces of defrosting information at a plurality of time points (dates and times) in association with one or a plurality of operation conditions at a corresponding time point of the plurality of time points. That is, in the present embodiment, the storage unit 90 stores each of pieces of defrosting information at a plurality of time points (dates and times) in association with various operation conditions used when the refrigeration cycle apparatus 1 operates in the heating mode at the time point when the piece of defrosting information is acquired. Although content of information stored in the storage unit 90 is not limited, the storage unit 90 stores data indicating that the outdoor air temperature (heat-source air temperature) is X° C., the outdoor air humidity (heat-source air humidity) is Y %, the number of rotations of the compressor 21 is Z rpm from 9 o'clock to 10 o'clock on Feb. 1, 2019, and a value obtained by dividing the number of defrosting operations by the heating operation period is a times/hour in the same time slot of the same date, for example. The value (hereinafter, referred to as a defrosting frequency) obtained by dividing the number of defrosting operations by the heating operation period is an example of the defrosting information. In the present embodiment, the defrosting information is the defrosting frequency although the type of the defrosting information is not limited. The defrosting information is not limited to the defrosting frequency and may be information from which a value serving as an index of a frequency of the defrosting operations relative to the heating operation period can be calculated.

It is also assumed that the storage unit 90 stores, as comparative data, each of pieces of defrosting information at a plurality of time points obtained through operations of a refrigeration cycle apparatus for testing known to be free from leakage of the refrigerant, in association with an operation condition used at the time point when the piece of defrosting information is acquired. The storage unit 90 may store, as comparative data, an operation condition and the defrosting information (for example, the defrosting frequency) corresponding to the operation condition that is theoretically calculated or obtained by simulation assuming that there is no refrigerant leakage, so that the operation condition and the defrosting information are associated each other. The storage unit 90 may also store, as comparative data, in association with each other, defrosting information and an operation condition acquired by actually causing the refrigeration cycle apparatus 1 to operate in the first year from introduction of the refrigeration cycle apparatus 1 with a low probability of leakage of the refrigerant. The storage unit 90 may also store in advance comparative data acquired by causing a refrigeration cycle apparatus for testing to operate, and may then replace the data with comparative data acquired by actually causing the refrigeration cycle apparatus 1 to operate in the first year from introduction.

Under such assumptions, the refrigerant leakage determination system 100D determines leakage of the refrigerant in accordance with the flowchart of FIG. 18, for example.

Since processing in step S1 to S4 is substantially the same as the processing in steps S1 to S4 in the flowchart of FIG. 3 described for the refrigerant leakage determination system 100 according to the first embodiment, description thereof is omitted.

In step S15, in coordinates of two or more dimensions obtained by assigning the value serving as the index of the frequency of the defrosting operations relative to the heating operation period to a first axis and assigning, for each of one or a plurality of first operation conditions among the operation conditions, a value of the first operation condition to another axis different from the first axis, the refrigerant leakage determining unit 85D of the refrigerant leakage determination system 100D plots, for pieces of defrosting information for a plurality of time points (the predetermined amount of information) stored in the storage unit 90, points each specified by the value serving as the index of the frequency of the defrosting operations calculated for each of the pieces of defrosting information and by the value(s) of the one or plurality of first operation conditions associated with the piece of defrosting information. Note that the term "the value serving as the index of the frequency of the defrosting operations calculated for the piece of defrosting information" encompasses the case where the piece of defrosting information is used as it is.

Specifically, in step S15, in two-dimensional coordinates obtained by assigning the defrosting frequency to the vertical axis and assigning the value of the outdoor air temperature (temperature of the heat-source air) which is one of the operation conditions to the horizontal axis as illustrated in FIGS. 15 and 16, the refrigerant leakage determining unit 85D according to the present embodiment plots, for pieces of defrosting information for a plurality of time points stored in the storage unit 90, points (points of actual operation data) each specified by the defrosting frequency calculated for each of defrosting information of the pieces of defrosting information and the outdoor air temperature associated with the piece of defrosting information.

In step S15, the refrigerant leakage determining unit 85D also plots, for comparison, points of comparative data in coordinates with the first axis assigned the defrosting frequency and the second axis assigned the value of the outdoor air temperature (temperature of the heat-source air) which is one of the operation conditions as illustrated in FIG. 17.

In step S16, the refrigerant leakage determining unit 85D compares a distribution of the points of the actual operation data with a distribution of the points of the comparative data in the graph. The distribution of the points of the comparative data is an example of a reference distribution. In step S17, the refrigerant leakage determining unit 85D determines leakage of the refrigerant, based on a comparison result of the distribution of the points of the actual operation data and the reference distribution.

Conceptually, in step S16, the refrigerant leakage determining unit 85D compares the distribution of a set (cluster) of the points of the actual operation data with the distribution of a set of the points of the comparative data so as to determine whether the distributions are similar to each other. In step S17, the refrigerant leakage determining unit 85D determines that there is leakage of the refrigerant if the distributions are not similar to each other and determines that the refrigerant is leaking if the distributions are not similar to each other.

In a specific example of the determination method, the refrigerant leakage determining unit 85D performs principal component analysis on the distribution of the points of the comparative data in step S16 to determine a first principal component axis (see FIG. 19). In step S16, the refrigerant leakage determining unit 85D also calculates a standard deviation σ in the distribution of the points of the comparative data. Further, in step S16, the refrigerant leakage determining unit 85D obtains a barycenter position of the distribution of the points of the actual operation data in the coordinates (see FIG. 19). In step S16, the refrigerant leakage determining unit 85D further obtains a distance d between the first principal component axis in the distribution of the points of the comparative data and the barycenter position in the distribution of the points of the actual operation data (see FIG. 19).

In step S16, the refrigerant leakage determining unit 85D then determines whether the value of the distance d is three times or more as large as the standard deviation a of the comparative data. If the value of the distance d is three time or more as large as the standard deviation a in the distribution of the points of the comparative data (for example, if the distribution of the points of the actual operation data is as illustrated in FIG. 16), the refrigerant leakage determining unit 85D determines that there is leakage of the refrigerant in step S17 and the process proceeds to step S11. If the value of the distance d is less than three times as large as the standard deviation σ in the distribution of the points of the comparative data (for example, if the distribution of the points of the actual operation data is as illustrated in FIG. 15), the refrigerant leakage determining unit 85D determines that there is no leakage of the refrigerant in step S17 and the process proceeds to step S8.

Since processing in step S8 to S11 in FIG. 18 is substantially the same as the processing in steps S8 to S11 in the flowchart of FIG. 3 described for the refrigerant leakage determination system 100 according to the first embodiment, description thereof is omitted. Note that the processing in steps S8 and S9 (that is, determination of leakage of the refrigerant based on the defrosting period information) may be omitted.

In the description above, it is described that the refrigerant leakage determining unit 85D creates a graph. However, this description is merely for facilitating understanding of the processing performed by the refrigerant leakage determining unit 85D. Thus, the refrigerant leakage determining unit 85D may determine leakage of the refrigerant by simply calculating the distance d and the standard deviation a through calculation and comparing the distribution of the points of the actual operation data and the distribution of the points of the comparative data without actually creating a graph.

In addition, the comparison of the distribution of the points of the actual operation data and the distribution of the points of the comparative data performed by the refrigerant leakage determining unit 85D is not limited to the method described above. For example, the refrigerant leakage determining unit 85D may determine leakage of the refrigerant, based on whether a distance between the barycenter position of the distribution of the points of the actual operation data and the barycenter position of the distribution of the points of the comparative data is greater than or equal to a predetermined threshold. The refrigerant leakage determining unit 85D may determine leakage of the refrigerant, based on a degree with which a range in which the points of the actual operation data are present coincides with a range in which the points of the comparative data are present.

In the description above, the case where the first operation condition is the outdoor air temperature is described by way of example. However, the first operation condition may be the outdoor air humidity or the number of rotations of the compressor 21 during the heating operation.

Furthermore, in the description above, the case where there is only one kind of the first operation condition (outdoor air temperature) and the refrigerant leakage determining unit 85D determines leakage of the refrigerant in the refrigerant circuit 10 of the refrigeration cycle apparatus 1 based on a result of comparing, with the reference distribution, the distribution of the points of the actual operation data plotted in the two-dimensional coordinates obtained by assigning the value of the defrosting frequency to the vertical axis and assigning the value of the outdoor air temperature to the horizontal axis is described as an example. However, the number of first operation conditions is not limited to this, and there may be a plurality of kinds of the first operation conditions.

For example, the first operation conditions may be two kinds, which are the outdoor air temperature and the outdoor air humidity. The refrigerant leakage determining unit 85D may determine leakage of the refrigerant in the refrigerant circuit 10 of the refrigeration cycle apparatus 1, based on a result of comparing, with the reference distribution, using a method similar to the above-described method, a distribution of points obtained when plotting, for pieces of defrosting information for a plurality of time points stored in the storage unit 90, points each specified by the defrosting frequency calculated for each of defrosting information and by the outdoor air temperature and the outdoor air humidity that are associated with the piece of defrosting information, in three-dimensional coordinates obtained by assigning the value of the defrosting frequency to a Z axis, the value of the outdoor air temperature to an X axis, and the value of the outdoor air humidity to a Y axis, for example. The same applies to the case where there are three kinds or more of the first operation conditions.

<Modifications>

Each of the embodiments described above may be appropriately combined with a configuration of another embodiment within a range without contradiction with each other.

Modifications of the embodiments above will be described below. Note that a plurality of modifications below may be appropriately used in combination within a range without contradiction with each other.

(1) Modification A

In the embodiments described above, the defrosting information acquiring unit 82 acquires the defrosting information from the controller 8 of the refrigeration cycle apparatus 1. The defrosting period information acquiring unit 83 acquires the defrosting period information from the controller 8 of the refrigeration cycle apparatus 1.

However, the configuration is not limited to this, and the defrosting information acquiring unit 82 may acquire the defrosting information, based on information of an image captured by a not-illustrated camera. For example, the defrosting information acquiring unit 82 may acquire the defrosting information, based on an image on a display unit of a remote control provided for the refrigeration cycle apparatus 1 and indicating the operation state or an image of a display lamp provided in the refrigeration cycle apparatus 1 and indicating the operation state.

In another example, the defrosting information acquiring unit 82 may acquire the defrosting information, based on audio information acquired by a not-illustrated microphone. For example, the defrosting information acquiring unit 82 may acquire the defrosting information, based on operation sound of the compressor 21 or the flow direction switching mechanism 22 of the heat source unit 2 of the refrigeration cycle apparatus 1.

In another example, the defrosting information acquiring unit 82 may detect execution of the heating operation or the defrosting operation by using a not-illustrated external sensor (such as a temperature sensor or ammeter, for example).

Note that the camera, the microphone, the external sensor, or the like may be a component of the refrigerant leakage determination system 100. The refrigerant leakage determination system 100 may be configured to receive image information, audio information, a measurement signal, or the like from an external camera, a microphone, or an external sensor, or the like, respectively.

(2) Modification B

The refrigerant leakage determination system of the refrigeration cycle apparatus 1 according to the embodiments described above determines leakage of the refrigerant. However, the configuration is not limited to this, and the refrigerant leakage determination system may determine an amount of leaked refrigerant.

An example will be described. For example, the storage unit 90 of the refrigerant leakage determination system 100 according to the first embodiment may store a plurality of reference values for the first value that correspond to an amount of decrease of the refrigerant. For example, the storage unit 90 stores a plurality of reference values, such as a reference value used for the first value when the amount of refrigerant is appropriate, a reference value used for the first value when the amount of decrease of the refrigerant is 10% of the appropriate amount of refrigerant, and a reference value used for the first value when the amount of decrease of the refrigerant is 20% of the appropriate amount of refrigerant. The refrigerant leakage determining unit 85 may then determine an amount of leaked refrigerant in steps in accordance with a result of comparing the first value obtained based on the defrosting information with the plurality of reference values. For example, the refrigerant leakage determining unit 85 may determine the reference value closest to the calculated first value and determine, as the amount of leaked refrigerant, the amount of decrease of the refrigerant corresponding to this reference value.

(3) Modification C

In the embodiments described above, the refrigerant leakage determination system determines leakage of the refrigerant in the refrigeration cycle apparatus 1, based on the defrosting information regarding a relationship between the heating operation period and the number of defrosting operations for defrosting the heat-source-side heat exchanger 23 in an air conditioner serving as an example of the refrigeration cycle apparatus 1.

Figure 10:
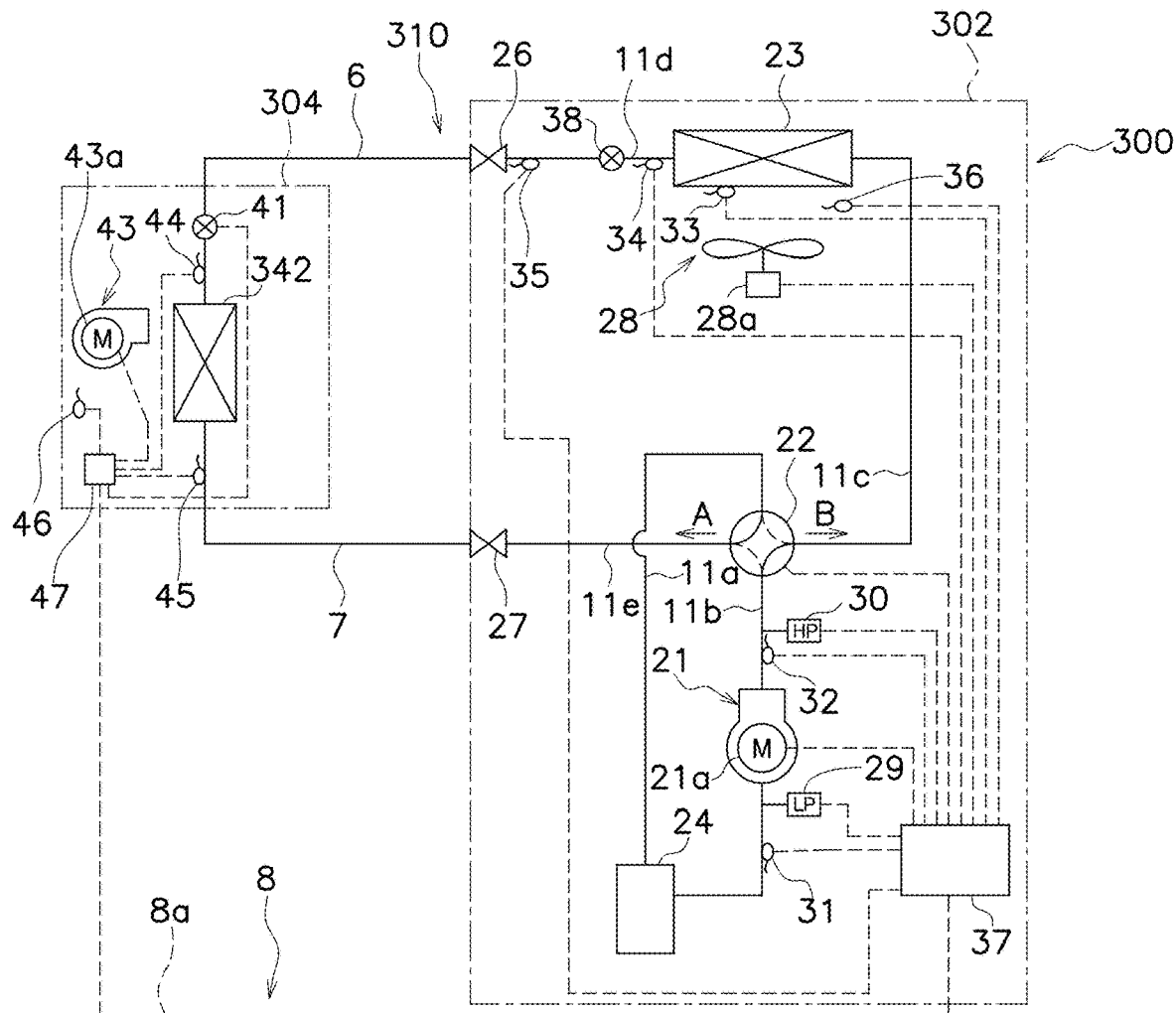
FIG. 10 illustrates another example of a refrigeration cycle apparatus for which a refrigerant leakage determination system determines whether there is leakage of refrigerant.

However, the refrigeration cycle apparatus for which leakage of the refrigerant is to be determined may be a refrigeration cycle apparatus 300 illustrated in FIG. 10. In the refrigeration cycle apparatus illustrated in FIG. 10, components substantially the same as those of the refrigeration cycle apparatus 1 are denoted by the same reference signs.

The refrigeration cycle apparatus 300 is a refrigerating machine that cools a store room with a use-side heat exchanger 342 of a use unit 304. The refrigeration cycle apparatus 300 includes a refrigerant circuit 310 including the compressor 21 of a heat source unit 302 and the use-side heat exchanger 342 serving as an example of the first heat exchanger. The refrigeration cycle apparatus 300 has, as operating modes, a cooling mode serving as an example of a normal mode in which the use-side heat exchanger 342 is caused to function as an evaporator, and a defrosting mode in which the use-side heat exchanger 342 frosted during an operation in the cooling mode is defrosted. Detailed description of the configuration and operations of the refrigeration cycle apparatus 300 will be omitted.

The refrigerant leakage determination system of the refrigeration cycle apparatus 300 includes the defrosting information acquiring unit 82, the storage unit 90, and the refrigerant leakage determining unit 85, similarly to the refrigerant leakage determination system 100 according to the first embodiment. The defrosting information acquiring unit 82 acquires the defrosting information regarding a relationship between a normal operation period for which the refrigeration cycle apparatus 1 operates in the cooling mode and the number of defrosting operations in which the refrigeration cycle apparatus 1 operates in the defrosting mode. The storage unit 90 stores the defrosting information acquired by the defrosting information acquiring unit 82. The refrigerant leakage determining unit 85 determines, based on the defrosting information, leakage of refrigerant in the refrigerant circuit 10 of the refrigeration cycle apparatus 1. Note that the refrigerant leakage determination system of the refrigeration cycle apparatus 300 may include the defrosting period information acquiring unit 83, the operation condition acquiring unit 84, and the reference value calculating unit 86 as in the first embodiment. As the refrigerant leakage determination system of the refrigeration cycle apparatus 300, the refrigerant leakage determination system 100A according to the second embodiment or the refrigerant leakage determination system 100B or 100C according to the third embodiment may be used.

By applying the refrigerant leakage determination system and the refrigerant leakage determination method according to the present disclosure to such a refrigeration cycle apparatus 300, leakage of the refrigerant can be detected without requiring complicated processing for acquiring special information such as a capacity of a heat exchanger.

(4) Modification D

In the embodiments described above, the refrigeration cycle apparatus 1 that performs, as the defrosting operation, the reverse cycle defrosting operation in which the refrigerant is caused to circulate through the refrigerant circuit 10 in an opposite direction to the direction of the normal operation is described. However, the refrigeration cycle apparatus 1 is not limited to this. The refrigeration cycle apparatus may be the refrigeration cycle apparatus 1 that performs, as the defrosting operation, a forward cycle defrosting operation in which the refrigerant is caused to circulate through the refrigerant circuit 10 in the same direction as that of the normal operation.

<Supplementary Note>

The configurations of the first to fourth embodiments and modifications described above may be appropriately combined within a range without contradiction with each other.

While the embodiments of the present disclosure have been described above, it should be understood that various modifications can be made on the configurations and details without departing from the gist and the scope of the present disclosure that are described in the claims.

REFERENCE SIGNS LIST

1, 300 refrigeration cycle apparatus
10, 310 refrigerant circuit
21 compressor
23 heat-source-side heat exchanger (first heat exchanger)
82 defrosting information acquiring unit
83 defrosting period information acquiring unit
84 operation condition acquiring unit
85, 85A, 85B, 85C, 85D refrigerant leakage determining unit
86, 86A reference value calculating unit
90 storage unit
100, 100A, 100B, 100C, 100D refrigerant leakage determination system
342 use-side heat exchanger (first heat exchanger)
851, 852 discriminator
C first refrigeration cycle apparatus
G1, G2, . . . GN refrigeration cycle apparatus group

CITATION LIST

Patent Literature

PTL 1: Japanese Unexamined Patent Application Publication No. 2009-115340

The invention claimed is:

1. A refrigerant leakage determination system of a refrigeration cycle apparatus including a refrigerant circuit and having, as operating modes, at least a normal mode and a defrosting mode, the refrigerant circuit including a compressor and a first heat exchanger the normal mode being a mode in which the first heat exchanger is caused to function as an evaporator, the defrosting mode being a mode in which the first heat exchanger frosted during an operation in the normal mode is defrosted, the refrigerant leakage determination system comprising:

a processor configured to acquire defrosting information regarding a relationship between a normal operation period for which the refrigeration cycle apparatus operates in the normal mode and the number of defrosting operations in which the refrigeration cycle apparatus operates in the defrosting mode; and memory that stores the acquired defrosting information; wherein the processor is further configured to determine, based on the acquired defrosting information, leakage of refrigerant in the refrigerant circuit of the refrigeration cycle apparatus.

2. The refrigerant leakage determination system according to claim 1, wherein:
the processor is further configured to acquire an operation condition including at least one of a temperature of air that exchanges heat in the first heat exchanger when the refrigeration cycle apparatus is in operation in the normal mode, a humidity of the air that exchanges heat in the first heat exchanger when the refrigeration cycle apparatus is in operation in the normal mode, and the number of rotations of the compressor when the refrigeration cycle apparatus is in operation in the normal mode, and
the processor determines, based further on the operation condition, leakage of the refrigerant in the refrigerant circuit of the refrigeration cycle apparatus.

3. The refrigerant leakage determination system according to claim 2,
wherein each of pieces of the defrosting information for a plurality of time points is stored in the memory in association with one or a plurality of the operation conditions for a corresponding time point of the plurality of time points, and
wherein the processor determines leakage of the refrigerant in the refrigerant circuit of the refrigeration cycle apparatus, based on a result of comparing a distribution of points with a reference distribution, the distribution of points being a distribution obtained when the points each specified by a value serving as an index of the frequency of the defrosting operations calculated for each of the pieces of defrosting information for the plurality of time points stored in the memory and by a value of one or a plurality of first operation conditions, among the operation conditions, associated with the piece of defrosting information are plotted in coordinates of two or more dimensions obtained by assigning the value serving as the index of the frequency of the defrosting operations relative to the normal operation period to a first axis and assigning, for each of the one or plurality of first operation conditions, a value of the first operation condition to another axis different from the first axis.

4. The refrigerant leakage determination system according to claim 2,
wherein the processor calculates, as a first value, based on the acquired defrosting information, a value serving as an index of a frequency of the defrosting operations relative to the normal operation period or a value serving as an index of a change in the frequency of the defrosting operations relative to the normal operation period, and determines, based on a result of comparing the first value with a reference value, leakage of the refrigerant in the refrigerant circuit of the refrigeration cycle apparatus.

5. The refrigerant leakage determination system according to claim 2, wherein:
the processor acquires defrosting period information regarding a period of each defrosting operation in which the refrigeration cycle apparatus operates in the defrosting mode, and
the processor determines, based further on the defrosting period information, leakage of the refrigerant in the refrigerant circuit of the refrigeration cycle apparatus.

6. The refrigerant leakage determination system according to claim 1,
wherein the processor calculates, as a first value, based on the acquired defrosting information, a value serving as an index of a frequency of the defrosting operations relative to the normal operation period or a value serving as an index of a change in the frequency of the defrosting operations relative to the normal operation period, and determines, based on a result of comparing the first value with a reference value, leakage of the refrigerant in the refrigerant circuit of the refrigeration cycle apparatus.

7. The refrigerant leakage determination system according to claim 6, wherein:
the processor calculates the reference value, based on the defrosting information of past stored in the memory.

8. The refrigerant leakage determination system according to claim 7,
wherein the processor calculates the reference value, based on the defrosting information of past stored in the memory in a predetermined period from introduction of the refrigeration cycle apparatus.

9. The refrigerant leakage determination system according to claim 8, wherein:
the processor acquires defrosting period information regarding a period of each defrosting operation in which the refrigeration cycle apparatus operates in the defrosting mode, and
the processor determines, based further on the defrosting period information, leakage of the refrigerant in the refrigerant circuit of the refrigeration cycle apparatus.

10. The refrigerant leakage determination system according to claim 7,
wherein the refrigerant leakage determination system is a system that determines leakage of refrigerant for a plurality of the refrigeration cycle apparatuses, and
wherein the processor calculates the reference value, based on the defrosting information of past of the plurality of refrigeration cycle apparatuses stored in the memory.

11. The refrigerant leakage determination system according to claim 10,
wherein, for each of refrigeration cycle apparatus groups each including a plurality of the refrigeration cycle apparatuses having similar conditions in terms of a temperature and a humidity of air that exchanges heat in the first heat exchanger, the processor calculates the reference value, based on the defrosting information of past stored in the memory as to the plurality of refrigeration cycle apparatuses included in the refrigeration cycle apparatus group, and
wherein when determining leakage of the refrigerant in the refrigerant circuit of a first refrigeration cycle apparatus that is one of the plurality of refrigeration cycle apparatuses, the processor determines, based on a result of comparing the first value with the reference value, leakage of the refrigerant in the refrigerant circuit of the first refrigeration cycle apparatus, the first value being a value calculated based on the defrosting information of the first refrigeration cycle apparatus, the reference value being a value calculated for the refrigeration cycle apparatus group having a temperature and a humidity similar to those of the air that exchanges heat in the first heat exchanger of the first refrigeration cycle apparatus.

12. The refrigerant leakage determination system according to claim 11, wherein:
the processor acquires defrosting period information regarding a period of each defrosting operation in which the refrigeration cycle apparatus operates in the defrosting mode, and the processor determines, based further on the defrosting period information, leakage of the refrigerant in the refrigerant circuit of the refrigeration cycle apparatus.

13. The refrigerant leakage determination system according to claim 10, wherein:
the processor acquires defrosting period information regarding a period of each defrosting operation in which the refrigeration cycle apparatus operates in the defrosting mode, and
the processor determines, based further on the defrosting period information, leakage of the refrigerant in the refrigerant circuit of the refrigeration cycle apparatus.

14. The refrigerant leakage determination system according to claim 7, wherein:
the processor acquires defrosting period information regarding a period of each defrosting operation in which the refrigeration cycle apparatus operates in the defrosting mode, and
the processor determines, based further on the defrosting period information, leakage of the refrigerant in the refrigerant circuit of the refrigeration cycle apparatus.

15. The refrigerant leakage determination system according to claim 6, wherein:
the processor acquires defrosting period information regarding a period of each defrosting operation in which the refrigeration cycle apparatus operates in the defrosting mode, and
the processor determines, based further on the defrosting period information, leakage of the refrigerant in the refrigerant circuit of the refrigeration cycle apparatus.

16. The refrigerant leakage determination system according to claim 1, wherein:
the processor acquires defrosting period information regarding a period of each defrosting operation in which the refrigeration cycle apparatus operates in the defrosting mode, and
the processor determines, based further on the defrosting period information, leakage of the refrigerant in the refrigerant circuit of the refrigeration cycle apparatus.

17. The refrigerant leakage determination system according to claim 1, wherein:
the processor acquires an operation condition including at least one of a temperature of air that exchanges heat in the first heat exchanger when the refrigeration cycle apparatus is in operation in the normal mode, a humidity of the air that exchanges heat in the first heat exchanger when the refrigeration cycle apparatus is in operation in the normal mode, and the number of rotations of the compressor when the refrigeration cycle apparatus is in operation in the normal mode, and
the processor includes a discriminator that has learned a relationship between whether there is leakage of the refrigerant in the refrigerant circuit and the defrosting information and the operation condition, and determines whether there is leakage of the refrigerant in the refrigerant circuit by inputting the acquired defrosting information and the acquired operation condition to the discriminator.

18. The refrigerant leakage determination system according to claim 1, wherein:
the processor acquires defrosting period information regarding a period of each defrosting operation in which the refrigeration cycle apparatus operates in the defrosting mode;
the processor acquires an operation condition including at least one of a temperature of air that exchanges heat in the first heat exchanger when the refrigeration cycle apparatus is in operation in the normal mode, a humidity of the air that exchanges heat in the first heat exchanger when the refrigeration cycle apparatus is in operation in the normal mode, and the number of rotations of the compressor when the refrigeration cycle apparatus is in operation in the normal mode, and
the processor includes a discriminator that has learned a relationship between whether there is leakage of the refrigerant in the refrigerant circuit and the defrosting information, the defrosting period information, and the operation condition, and determines whether there is leakage of the refrigerant in the refrigerant circuit by inputting the acquired defrosting information, the acquired defrosting period information, and the acquired operation condition to the discriminator.

19. A refrigeration cycle apparatus including a refrigerant circuit and having, as operating modes, at least a normal mode and a defrosting mode, the refrigerant circuit including a compressor and a first heat exchanger, the normal mode being a mode in which the first heat exchanger is caused to function as an evaporator, the defrosting mode being a mode in which the first heat exchanger frosted during an operation in the normal mode is defrosted, the refrigeration cycle apparatus comprising:
a processor configured to acquire defrosting information regarding a relationship between a normal operation period for which the refrigeration cycle apparatus operates in the normal mode and the number of defrosting operations in which the refrigeration cycle apparatus operates in the defrosting mode; and
memory that stores the defrosting information acquired by the defrosting information acquiring unit; wherein
the processor is further configured to determine, based on the defrosting information, leakage of refrigerant in the refrigerant circuit.

* * * * *